United States Patent
Moriya et al.

(10) Patent No.: US 8,805,113 B2
(45) Date of Patent: Aug. 12, 2014

(54) IMAGE PROCESSING DEVICE AND METHOD AND IMAGE DISPLAY DEVICE

(71) Applicant: Mitsubishi Electric Corporation, Tokyo (JP)

(72) Inventors: Shotaro Moriya, Tokyo (JP); Satoshi Yamanaka, Tokyo (JP); Hideki Yoshii, Tokyo (JP); Hidetsugu Suginohara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 116 days.

(21) Appl. No.: 13/673,778

(22) Filed: Nov. 9, 2012

(65) Prior Publication Data
US 2013/0121611 A1 May 16, 2013

(30) Foreign Application Priority Data

| Nov. 11, 2011 | (JP) | 2011-247534 |
| Dec. 1, 2011 | (JP) | 2011-263714 |
| Jan. 11, 2012 | (JP) | 2012-003026 |
| Aug. 7, 2012 | (JP) | 2012-174983 |

(51) Int. Cl.
*G06K 9/40* (2006.01)
*G06T 3/40* (2006.01)
*G06T 5/20* (2006.01)
*G06T 5/00* (2006.01)

(52) U.S. Cl.
CPC .............. *G06T 5/001* (2013.01); *G06T 3/403* (2013.01); *G06T 5/20* (2013.01); *G06T 3/4053* (2013.01); *G06T 5/003* (2013.01); *G06T 2207/20192* (2013.01)
USPC ...................................................... 382/266

(58) Field of Classification Search
None
See application file for complete search history.

(56) References Cited

U.S. PATENT DOCUMENTS

| 7,912,323 | B2* | 3/2011 | Okuno et al. ................. 382/300 |
| 7,945,120 | B2* | 5/2011 | Tanaka .......................... 382/299 |
| 7,970,231 | B2* | 6/2011 | Tamura et al. ................ 382/266 |
| 7,986,858 | B2* | 7/2011 | Matsumoto et al. .......... 382/298 |
| 8,233,745 | B2* | 7/2012 | Matsumoto et al. .......... 382/299 |
| 2004/0179750 | A1 | 9/2004 | Kumakura |
| 2007/0083114 | A1* | 4/2007 | Yang et al. .................... 600/437 |
| 2008/0025622 | A1 | 1/2008 | Hanamoto et al. |
| 2008/0267532 | A1 | 10/2008 | Matsumoto et al. |
| 2008/0267533 | A1 | 10/2008 | Ida et al. |
| 2009/0074328 | A1 | 3/2009 | Matsumoto et al. |
| 2009/0226097 | A1* | 9/2009 | Matsumoto et al. .......... 382/199 |
| 2009/0324090 | A1* | 12/2009 | Tanaka .......................... 382/199 |
| 2010/0123792 | A1 | 5/2010 | Nagumo et al. |

(Continued)

FOREIGN PATENT DOCUMENTS

| JP | 2002-77622 A | 3/2002 |
| JP | 2004-133592 A | 4/2004 |

(Continued)

*Primary Examiner* — Bhavesh Mehta
*Assistant Examiner* — Feng Niu
(74) *Attorney, Agent, or Firm* — Birch, Stewart, Kolasch & Birch, LLP

(57) ABSTRACT

An image processing device includes an edge-enhancing image enlarger that converts an input image to a high-resolution image with edge enhancement. A difference calculator determines differences between the high-resolution image and the input image. A high-resolution image corrector corrects the high-resolution image by diffusing the differences to pixels of the high-resolution image, thereby generating a corrected image in which edges are enhanced without image degradation in textured areas.

16 Claims, 22 Drawing Sheets

(56) References Cited

U.S. PATENT DOCUMENTS

| | | |
|---|---|---|
| 2010/0134518 A1 | 6/2010 | Moriya et al. |
| 2010/0183232 A1 | 7/2010 | Oryoji et al. |
| 2010/0322536 A1* | 12/2010 | Tezuka ............... 382/300 |
| 2011/0075947 A1 | 3/2011 | Miyamoto |
| 2013/0044965 A1* | 2/2013 | Chien et al. ............ 382/266 |

FOREIGN PATENT DOCUMENTS

| | | |
|---|---|---|
| JP | 2004-214977 A | 7/2004 |
| JP | 2006-287623 A | 10/2006 |
| JP | 2008-33692 A | 2/2008 |
| JP | 2008-276380 A | 11/2008 |
| JP | 2008-276393 A | 11/2008 |
| JP | 2009-60464 A | 3/2009 |
| JP | 2009-70123 A | 4/2009 |
| JP | 2009-93676 A | 4/2009 |
| JP | 2010-122934 | 6/2010 |
| JP | 2010-170340 A | 8/2010 |
| JP | 2011-76274 A | 4/2011 |
| WO | WO 2009/110328 A1 | 9/2009 |

* cited by examiner

IMAGE PROCESSING DEVICE AND METHOD AND IMAGE DISPLAY DEVICE

BACKGROUND OF THE INVENTION

1. Field of the Invention

The present invention relates to an image processing device, an image processing method, an image display device, and a recording medium storing a program for executing the image display method.

2. Description of the Related Art

When an enlarged image is output, in conventional image processing, edge enhancement is carried out to remove blur.

For example, in U.S. Patent Application Publication No. 2010/0134518, Moriya et al. disclose an image processing apparatus having a first image enlarging means that enlarges an input image and outputs a first enlarged image, a high-frequency component image generating means that extracts a high-frequency component of the input image and outputs a first high-frequency component image, a second image enlarging means that enlarges the first high-frequency component image and outputs a second enlarged image, a high-frequency component image processing means that extracts a high-frequency component from the image obtained by non-linear processing on the second enlarged image and outputs a second high-frequency component image, and a means for adding the first enlarged image and the second high-frequency component image to output an enlarged image with enhanced edges.

Conventional image processing apparatus for output of enlarged images with enhanced edges tends to increase the values of pixels having values higher than the local average of the pixels around them, and decrease the values of pixels having values lower than the local average of the pixels around them.

This is done because increasing the values of pixels having values higher than the local average of the pixels around them and decreasing the values of pixels having values lower than the local average of the pixels around them can make edges sharper and eliminate blur in the enlarged image.

When the values of pixels having values higher than the local average of the pixels around them are increased and the values of pixels having values lower than the local average of the pixels around them are decreased, however, the result of this processing may look unnatural in areas lacking edges.

In textured areas, for example, increasing the values of pixels having values higher than the local average of the pixels around them and decreasing the values of pixels having values lower than the local average of the pixels around them divides the pixels into two classes, one having high values and the other having low values, so that fine patterns become indiscernible and the resolution appears to be reduced.

SUMMARY OF THE INVENTION

The invention provides an image processing device including:

an edge-enhancing image enlarger for converting an input image having a first resolution to a high-resolution image having a second resolution, edges included in the input image being enhanced in the high-resolution image;

a difference calculator for determining differences between the high-resolution image and the input image; and a high-resolution image corrector for correcting the high-resolution image by diffusing the differences to pixels in the high-resolution image, thereby generating a corrected image, and outputting the corrected image as an output image.

An image processing device according to the present invention generates pixels having a variety of pixel values in textured areas, providing a higher perceived resolution in textured areas as well as other areas.

DETAILED DESCRIPTION OF THE INVENTION

Embodiment A1

Figure 1:
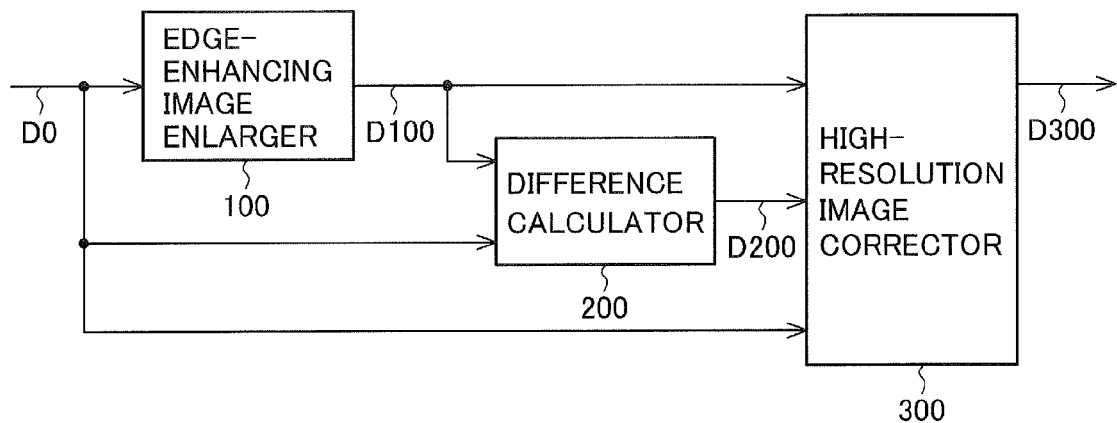
FIG. 1 is a block diagram of an image processing device in embodiments A1, A2, B1, B2, C1, and C2 of the invention.

FIG. 1 is a block diagram of an image processing device in embodiment A1 of the invention. The image processing device in embodiment A1 has an edge-enhancing image enlarger 100, a difference calculator 200, and a high-resolution image corrector 300.

The edge-enhancing image enlarger 100 receives an input image D0 and outputs an edge-enhanced enlarged image D100 having more pixels than the input image D0. The edge-enhanced enlarged image D100 is an enlarged image in which edges in the input image D0 are enhanced. The enlarged image will also be referred to as a high-resolution image, and the input image as a low-resolution image.

The difference calculator 200 outputs difference data D200 expressing the difference between the input image D0 and the edge-enhanced enlarged image D100.

The high-resolution image corrector 300 corrects the edge-enhanced enlarged image D100 so as to partially or completely cancel out the differences expressed by the difference data D200, and outputs the result as an output image D300.

The edge-enhancing image enlarger 100, difference calculator 200, and high-resolution image corrector 300 will be described below.

The edge-enhanced enlarged image D100 generated by the edge-enhancing image enlarger 100 is an enlarged image in which edges in the input image D0 are enhanced. A known method of generating an enlarged image in which edges in the input image D0 are enhanced may be used; for example, the image processing apparatus disclosed by Moriya et al. may be used.

Figure 2:
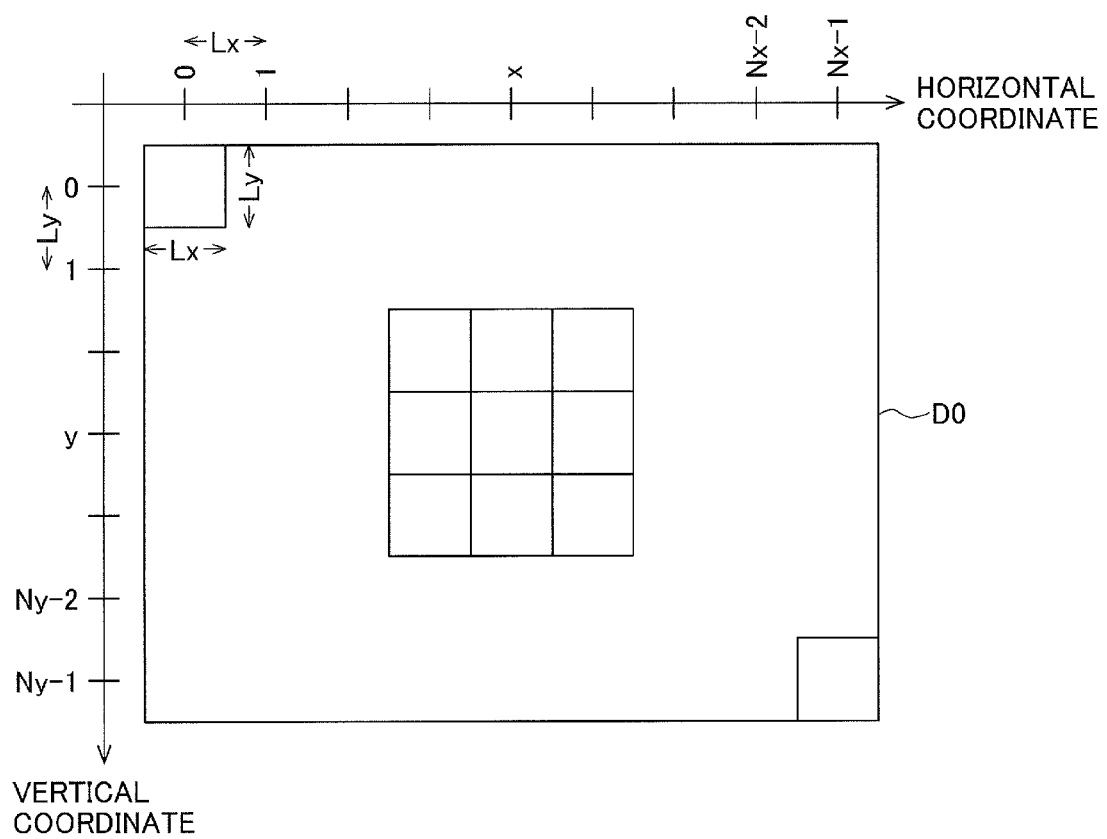
FIG. 2 schematically illustrates the arrangement of pixels in an input image D0.

FIG. 2 schematically illustrates the input image D0.

The smallest squares in FIG. 2 represent pixels in the input image D0.

If Lx is the width of the pixels constituting the input image D0, that is, the spacing between horizontally adjacent pixels (the distance between the centers of the horizontally adjacent pixels), Ly is the pixel height, that is, the spacing between vertically adjacent pixels (the distance between the centers of the vertically adjacent pixels), Nx is the number of pixels in the horizontal direction, and Ny is the number of pixels in the vertical direction, then the input image D0 is represented as a two-dimensional array of pixels of width Lx and height Ly, having Nx pixels arranged horizontally and Ny pixels arranged vertically.

If horizontal and vertical coordinates with unit lengths Lx and Ly are defined in the horizontal and vertical directions of the input image D0, the position of each pixel constituting the input image D0 is represented as $$(x,y)=(s,t)$$

by using a variable s, which is a non-negative integer less than Nx, and a variable t, which is a non-negative integer less than Ny. For the pixel at the top left corner of the screen, x=0 and y=0. The x value increases by '1' for each pixel to the right; the y value increases by '1' for each pixel below.

The pixel at coordinates (x, y) in the input image D0 will be denoted P0(x, y) and its pixel value will be denoted D0(x, y). Pixel P0(x, y) in the input image D0 may also be denoted simply pixel P0.

The scale factors in the horizontal and vertical directions in the edge-enhancing imager enlarger 100 are denoted Sx and Sy. The width of each pixel constituting the edge-enhanced enlarged image D100 is Lx/Sx, and the height is Ly/Sy. If Mx is the number of pixels in the horizontal direction of the edge-enhanced enlarged image D100, and My is the number of pixels in the vertical direction, $$Mx=[Sx \cdot Nx]$$

$$My=[Sy \cdot Ny]$$

The symbol [A] represents the greatest integer not exceeding A. For example, [10]=10 and [10.5]=10. The edge-enhanced enlarged image D100 is represented as a two-dimensional array of pixels of width Lx/Sx and height Ly/Sy, measuring Mx pixels horizontally and My pixels vertically.

In a coordinate system in which the horizontal and vertical unit lengths are the same as the horizontal and vertical unit lengths Lx, Ly, the position of each pixel in the edge-enhanced enlarged image D100 is expressed as $$(x,y)=(u/Sx,v/Sy)$$

by using a variable u, which is a non-negative integer less than Mx, and a variable v, which is a non-negative integer less than My. The horizontal pixel spacing becomes 1/Sx, and the vertical pixel spacing becomes 1/Sy.

Figure 3:
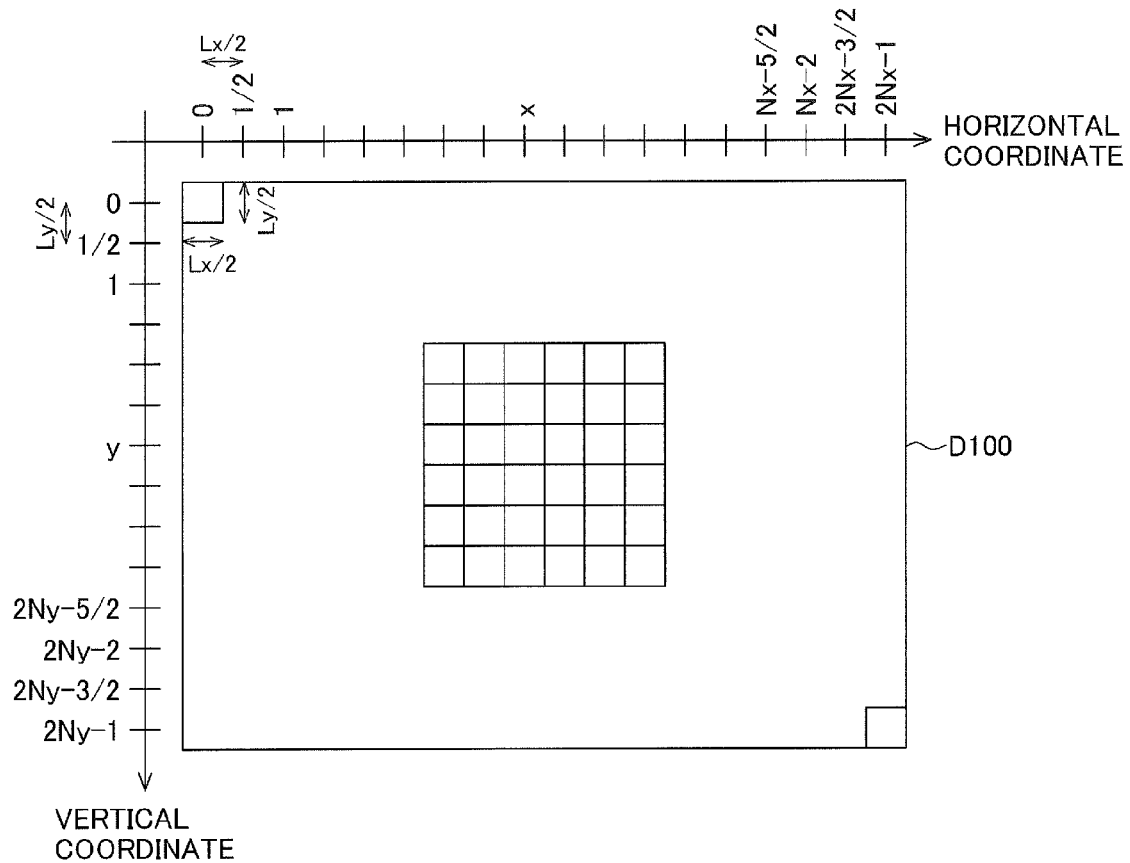
FIG. 3 schematically illustrates the arrangement of pixels in an edge-enhanced enlarged image D100.

FIG. 3 schematically illustrates the edge-enhanced enlarged image D100 when Sx=2 and Sy=2. The smallest squares in FIG. 3 represent pixels in the edge-enhanced enlarged image D100. Here $$Mx=[2Nx]$$

$$My=[2hy]$$

$$(x,y)=(u/2,v/2)$$

Unless otherwise noted, the coordinate systems including the horizontal and vertical coordinates mentioned below are the coordinate system shown in FIG. 2 or 3, in which the horizontal and vertical unit lengths are Lx and Ly, and the coordinates of points are coordinates in these coordinate systems.

The pixel at coordinates (x, y) in the edge-enhanced enlarged image D100 will be denoted P100(x, y) and its pixel value will be denoted D100(x, y). Pixel P100(x, y) in the edge-enhanced enlarged image D100 may also be denoted simply pixel P100.

The difference calculator 200 will now be described.

Figure 4:
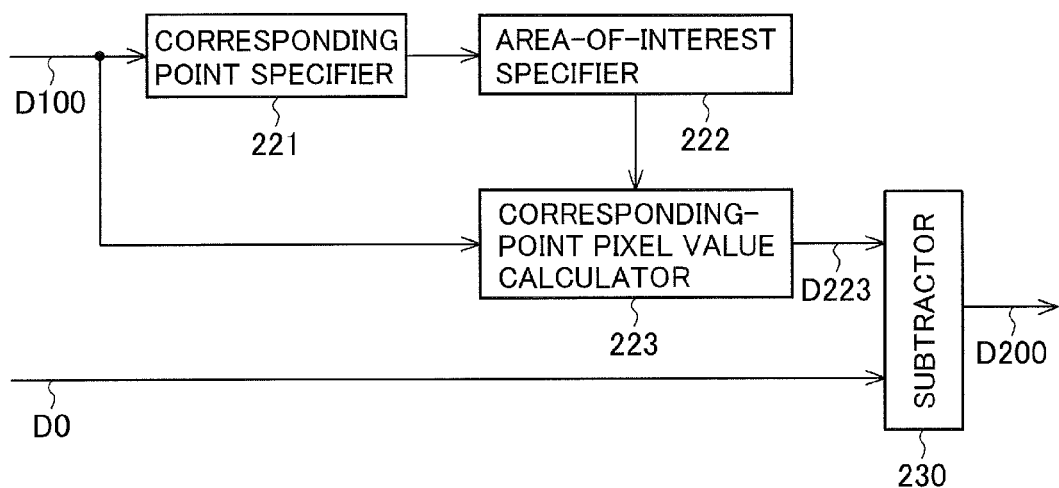
FIG. 4 is a block diagram showing an example of the structure of the difference calculator 200 in FIG. 1.

FIG. 4 is a block diagram showing the structure of the difference calculator 200. The difference calculator 200 has a corresponding-point specifier 221, an area-of-interest specifier 222, a corresponding-point pixel value calculator 223, and a subtractor 230.

The corresponding-point specifier 221 specifies, for each pixel P0 in the input image D0, a corresponding point in the edge-enhanced enlarged image D100 at the position corresponding to pixel P0. For example, the pixels P0(x, y) in the input image D0 are successively selected as the pixel of interest, and the corresponding-point specifier 221 specifies the point corresponding to the pixel of interest. The point corresponding to pixel P0(x, y) has the same coordinates (x, y). The corresponding point represented by these coordinates (x, y) will be denoted T(x, y). The corresponding point T(x, y) may be simply denoted T, without coordinates.

The area-of-interest specifier 222 specifies an area of interest for each corresponding point T, including a plurality of pixels P100 in the edge-enhanced enlarged image D100 in the vicinity of point T (a neighboring area including the corresponding point).

The corresponding-point pixel value calculator 223 calculates a weighted sum of the pixel values of the pixels P100 in the area of interest as a corresponding-point pixel value D223. This calculation is equivalent to assuming that each pixel P0 in the input image D0 has a corresponding pixel of the same size in the corresponding position in the edge-enhanced enlarged image D100, and obtaining its pixel value from the pixel values D100(x, y) of the pixels P100(x, y) in the edge-enhanced enlarged image D100.

If the corresponding-point pixel value D223 calculated for the corresponding point T(x, y) is denoted D223(x, y), this is expressed as follows.

$$D223(x, y) = \sum_{i=-Ia}^{Ib} \sum_{j=-Ja}^{Jb} W\left(x - \frac{[x \cdot Sx]}{Sx}, y - \frac{[y \cdot Sy]}{Sy}, i, j\right) \cdot D100\left(\frac{[x \cdot Sx] + i}{Sx}, \frac{[y \cdot Sy] + j}{Sy}\right) \quad (1)$$

Here, Ia, Ib, Ja, Jb are non-negative integers, and W is a coefficient function such that the following condition is satisfied for any real numbers x, y.

$$\sum_{i=-Ia}^{Ib} \sum_{j=-Ja}^{Jb} W\left(x - \frac{[x \cdot Sx]}{Sx}, y - \frac{[y \cdot Sy]}{Sy}, i, j\right) = 1 \quad (2)$$

The process expressed by equation (1) above is equivalent to low-pass filtering, and the degree of freedom in the filter settings increases as the area of interest increases in size, that is, as the number of pixels used in the calculation increases. A large area of interest is therefore preferable. In practice, an area of interest greater than the size of pixel P0 is preferable.

The subtractor 230 takes the difference between the corresponding-point pixel value D223 calculated for each corresponding point T and the pixel value of pixel P0 in the corresponding position in the input image D0 and outputs the results as difference data D200.

If the difference data D200 calculated for the corresponding point T(x, y) are denoted D200(x, y), the difference data D200(x, y) are expressed as the difference between the pixel value D0(x, y) and the corresponding-point pixel value D223 (x, y) as follows.

$$D200(x,y) = D223(x,y) - D0(x,y)$$

Next the high-resolution image corrector 300 will be described.

The high-resolution image corrector 300 subtracts, from the edge-enhanced enlarged image D100, difference diffusion quantities D302 obtained by diffusing the difference expressed by the difference data D200 obtained for each corresponding point T to the pixels P100 in the edge-enhanced enlarged image D100, as described later. This process corrects the edge-enhanced enlarged image D100 to cancel out, at least in part, the differences expressed by the difference data D200 between the input image D0 and the edge-enhanced enlarged image D100.

Figure 5:
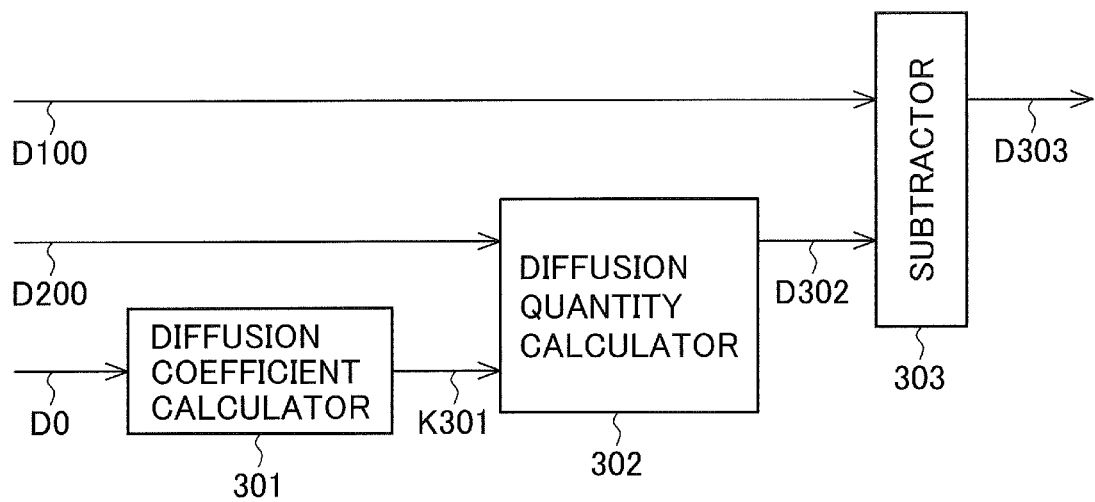
FIG. 5 is a block diagram showing an example of the structure of the high-resolution image corrector 300 in FIG. 1, as used in embodiment A1 of the invention.

FIG. 5 shows an example of the structure of the high-resolution image corrector 300.

The high-resolution image corrector 300 includes a diffusion coefficient calculator 301, a diffusion quantity calculator 302, and a subtractor 303.

The diffusion coefficient calculator 301 obtains difference diffusion coefficients K301 that determine the share of the difference data D200(x, y) that is diffused (allocated) to the pixels in the vicinity of each corresponding point T(x, y) among the pixels P100 in the edge-enhanced enlarged image D100. The difference diffusion coefficients K301 vary among the corresponding points T.

Pixels P100 in the vicinity of the corresponding point T(x, y) are expressed as follows by using integers i and j.

$$P100\left(\frac{[x \cdot Sx] + i}{Sx}, \frac{[y \cdot Sy] + j}{Sy}\right) \quad (3)$$

For example, among these pixels P100, the four pixels immediately surrounding the corresponding point T(x, y) (including the pixel inside of which the corresponding point T(x, y) lies) are expressed as follows.

$P100([x \cdot Sx]/Sx, [y \cdot Sy]/Sy)$ $P100(([x \cdot Sx]+1)/Sx, [y \cdot Sy]/Sy)$ $P100([x \cdot Sx]/Sx, ([y \cdot Sy]+1)/Sy)$ $P100(([x \cdot Sx]+1)/Sx, ([y \cdot Sy]+1)/Sy) \quad (4)$ If the difference data D200(x, y) are diffused from a center at pixel P100([x·Sx]/Sx, [y·Sy]/Sy) out as far as Ha pixels to the left and Hb pixels to the right horizontally and Va pixels above and Vb pixels below vertically, the difference diffusion coefficients K301 are expressed as a two-dimensional matrix having (Va+Vb+1) rows and (Ha+Hb+1) columns.

The element $a_{h,v}$ (v=−Va to +Vb, h=−Ha to +Hb) in the v-th row and h-th column (v=1 to Va+Vb+1, h=1 to Ha+Hb+1) of the two-dimensional matrix determines the amount of diffusion of the difference data D200(x, y) to the pixel in the position (h−(Ha+1)) pixels to the right of (if (h−(Ha+1)) has a negative value, ((Ha+1)−h) pixels to the left of) and (v−(Va+1)) pixels below (if (v−(Va+1)) has a negative value, ((Va+1)−v) pixels above) pixel P100([x·Sx]/Sx, [y·Sy]/Sy). This pixel can be expressed as follows.

$$P100\left(\frac{[x \cdot Sx]}{Sx} + \frac{h - (Ha+1)}{Sx}, \frac{[y \cdot Sy]}{Sy} + \frac{v - (Va+1)}{Sy}\right) \quad (5)$$

The difference diffusion coefficients K301 can be obtained by multiplying the elements of a plurality of different two-dimensional matrices An (n=1 to N, N≥2), each having (Va+Vb+1) rows and (Ha+Hb+1) columns, by different weighting coefficients bn (n=1 to N) and then adding the products.

$$K301 = \sum_{n=1}^{N} bn \cdot An \quad (6)$$

The N different two-dimensional matrices can be prepared, for example, by selecting N linearly independent two-dimensional matrices An.

The combination of coefficients bn may vary among the corresponding points T(x, y). For example, the coefficients bn may be obtained in accordance with the variation in pixel value of the input image. When the diffusion coefficient calculator 301 determines the diffusion coefficients K301 by adding four two-dimensional matrices An weighted with the coefficients bn (n=1 to 4), four pixels are selected in the vicinity of P0(x, y). If the four selected pixels are P0(x, y−1), P0(x−1, y), P0(x+1, y), P0(x, y+1), then the coefficients bn (n=1 to 4) are the absolute values of the differences between the pixel values of the selected pixels and the pixel value D0(x, y) in the input image, as given by the following equations.

$$b1(x,y) = |D0(x,y) - D0(x,y-1)|$$

$$b2(x,y) = |D0(x,y) - D0(x-1,y)|$$

$$b3(x,y) = |D0(x,y) - D0(x+1,y)|$$

$$b4(x,y) = |D0(x,y) - D0(x,y+1)| \quad (7)$$

By obtaining N different coefficients bn (n=1 to N) for the corresponding points T and by obtaining the sum of the N different matrices An weighted with the coefficients bn, different difference diffusion coefficients K301 can be obtained for the corresponding points T.

The difference diffusion coefficients calculated for the corresponding point T(x, y) will be denoted K301(x, y). The element in the v-th row and the h-th column of the two-dimensional matrix expressing the difference diffusion coefficients K301(x, y) will be denoted K301(x, y, h, v).

If the coefficients bn and K301, which vary with the corresponding point T(x, y), are denoted bn(x, y) and K301(x, y), respectively, equation (6) can be rewritten as follows.

$$\begin{pmatrix} K301(x,y,1,1) & K301(x,y,2,1) & \ldots & K301(x,y,Hc,1) \\ K301(x,y,1,2) & K301(x,y,2,2) & \ldots & K301(x,y,Hc,2) \\ \ldots & \ldots & \ldots & \ldots \\ K301(x,y,1,Vc) & K301(x,y,2,Vc) & \ldots & K301(x,y,Hc,Vc) \end{pmatrix} = \begin{pmatrix} b1(x,y) \times A1(1,1) & b1(x,y) \times A1(2,1) & \ldots & b1(x,y) \times A1(Hc,1) \\ b1(x,y) \times A1(1,2) & b1(x,y) \times A1(2,2) & \ldots & b1(x,y) \times A1(Hc,2) \\ \ldots & \ldots & \ldots & \ldots \\ b1(x,y) \times A1(1,Vc) & b1(x,y) \times A1(2,Vc) & \ldots & b1(x,y) \times A1(Hc,Vc) \end{pmatrix} +$$

$$\begin{pmatrix} b2(x,y) \times A2(1,1) & b2(x,y) \times A2(2,1) & \ldots & b2(x,y) \times A2(Hc,1) \\ b2(x,y) \times A2(1,2) & b2(x,y) \times A2(2,2) & \ldots & b2(x,y) \times A2(Hc,2) \\ \ldots & \ldots & \ldots & \ldots \\ b2(x,y) \times A2(1,Vc) & b2(x,y) \times A2(2,Vc) & \ldots & b2(x,y) \times A2(Hc,Vc) \end{pmatrix} +$$

$$\begin{pmatrix} bN(x,y) \times AN(1,1) & bN(x,y) \times AN(2,1) & \ldots & bN(x,y) \times AN(Hc,1) \\ bN(x,y) \times AN(1,2) & bN(x,y) \times AN(2,2) & \ldots & bN(x,y) \times AN(Hc,2) \\ \ldots & \ldots & \ldots & \ldots \\ bN(x,y) \times AN(1,Vc) & bN(x,y) \times AN(2,Vc) & \ldots & bN(x,y) \times AN(Hc,Vc) \end{pmatrix} \quad (8)$$

(In equation (8), Hc=Ha+Hb+1 and Vc=Va+Vb+1.)

For each pixel P100 in the edge-enhanced enlarged image D100, the diffusion quantity calculator 302 calculates the total sum of the difference data D200 diffused (allocated) to the pixel P100, on the basis of the difference diffusion coefficients K301 and the difference data D200 calculated for the corresponding points T in the vicinity of the pixel, and outputs the result as a difference diffusion quantity D302. The corresponding points T in the vicinity of pixel P100(x, y) are expressed as follows, using integers i and j.

$$T([x]+i, [y]+j)$$

The difference data calculated for a corresponding point T is expressed as $$D200([x]+i, [y]+j)$$

If the difference diffusion quantity D302 diffused from one or more corresponding points to the pixel value D100(x, y) (the total sum of the difference data diffused (allocated) from one or more corresponding points) is denoted D302(x, y), then:

$$D302(x,y) = \sum_{i,j} (D200([x]+i, [y]+j) \times K301([x]+i, [y]+j, \quad (9)$$

$$Sx \cdot x - [Sx([x]+i)] + Ha+1, Sy \cdot y - [Sy([y]+j)] + Va+1))$$

The difference diffusion quantity D302(x, y) can be determined by the above equation (9) for the reasons given below.

First, the amount of diffusion to pixel P100(x, y) of the difference data D200([x]+i, [y]+j) obtained for the corresponding point T([x]+i, [y]+j) is determined.

K301([x]+i, [y]+j, U, V) denotes the diffusion coefficient K301 that determines the amount of diffusion of the difference data D200([x]+i, [y]+j) obtained for the corresponding point T([x]+i, [y]+j) to a pixel in the position (U−(Ha+1)) pixels to the right of and (V−(Va+1)) pixels below the pixel $$P100\left(\frac{[Sx([x]+i)]}{Sx}, \frac{[Sy([y]+j)]}{Sy}\right) \quad (10)$$

(where U and V are integers).

Since the pixel spacing of the pixels P100 is 1/Sx, pixel P100(x, y) is positioned $$Sx\left(x - \frac{[Sx([x]+i)]}{Sx}\right) \quad (11)$$

pixels to the right of and $$Sy\left(y - \frac{[Sy([y]+j)]}{Sy}\right) \quad (12)$$

pixels below the pixel expressed by the above formula (10).

If the diffusion coefficient K301([x]+i, [y]+j, U, V) is a coefficient expressing the amount of diffusion from the pixel represented by formula (10) to pixel P100(x, y), the following equations hold.

$$U - (Ha+1) = Sx\left(x - \frac{[Sx([x]+i)]}{Sx}\right) \quad (13)$$

$$V - (Va+1) = Sy\left(y - \frac{[Sy([y]+j)]}{Sy}\right)$$

These equations (13) can be transformed as follows.

$$U = Sx\cdot x - [Sx([x]+i)] + Ha + 1$$

$$V = Sy\cdot y - [Sy([y]+j)] + Va + 1 \quad (14)$$

Accordingly, the coefficient K301 which determines the amount of diffusion of the difference data D200([x]+i, [y]+j) obtained for the corresponding point T([x]+i, [y]+j) to pixel P100(x, y) is expressed as follows.

K301([x]+i,[y]+j,Sx·x−[Sx([x]+i)]+Ha+1,Sy·y−[Sy ([y]+j)]+Va+1)　　　(15)

The amount of diffusion of the difference data D200([x]+i, [y]+j) obtained for the corresponding point T([x]+i, [y]+j), to pixel P100(x, y) is therefore expressed as follows.

D200([x]+i,[y]+j)×K301([x]+i,[y]+j,Sx·x−[Sx([x]+i)]+ Ha+1,Sy·y−[Sy([y]+j)]+Va+1)　　　(16)

Equation (9) is obtained by summation of equation (16) over and j.

The number of corresponding points from which difference data are diffused to each pixel (pixel to be corrected) depends on the position of the pixel relative to the corresponding points in its neighboring area.

Figure 6:
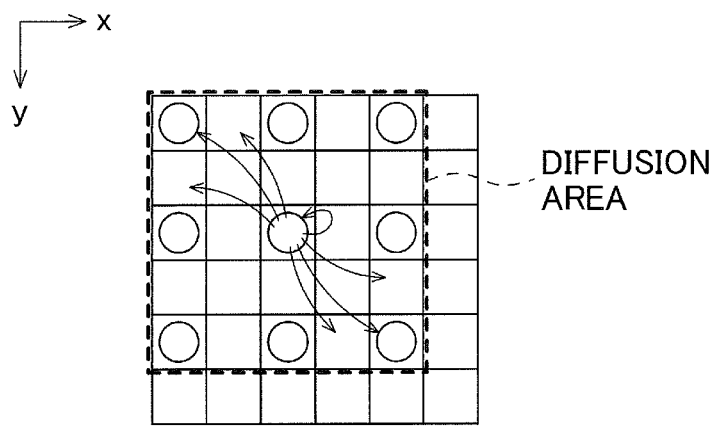
FIG. 6 shows an example of the diffusion of difference data from a corresponding point to neighboring pixels.

If the scale factors Sx and Sy are both 2 and the area from which the difference data are diffused (the diffusion area) is a 5×5 pixel area, then the difference data from a corresponding point (pixels containing corresponding points are circled in FIG. 6) are diffused to 5×5 pixels.

FIGS. 7A, 7B, 7C, and 7D show the relative positions of corresponding points from which difference data are diffused to a pixel to be corrected.

The pixels containing corresponding points are circled in these drawings.

Figure 7A:
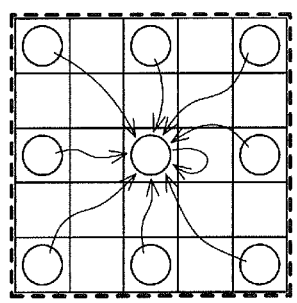
FIGS. 7A, 7B, 7C, and 7D show the relative positions of corresponding points from which difference data are diffused to a pixel to be corrected.

In FIG. 7A, the pixel to be corrected receives diffusion (allocation) of differences from the corresponding point included in the pixel and eight nearby corresponding points.

Figure 7B:
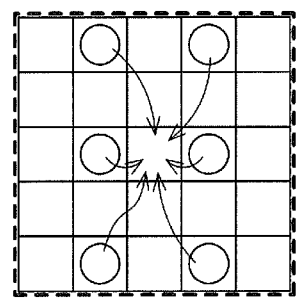
Figure 7C:
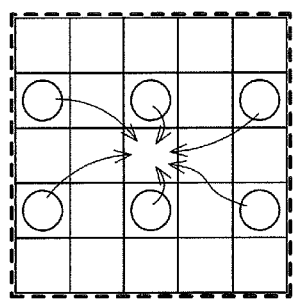

In FIGS. 7B and 7C, the pixel to be corrected receives diffusion (allocation) of differences from six nearby corresponding points.

Figure 7D:
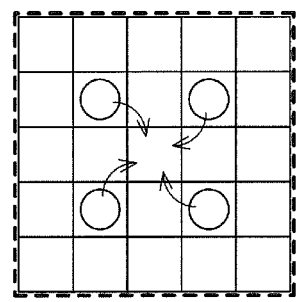

In FIG. 7D, the pixel to be corrected receives diffusion (allocation) of differences from four nearby corresponding points.

The number of corresponding points from which differences are diffused thus varies depending on the pixel to be corrected. Since a pixel receiving error diffusion from a large number of corresponding points tends to receive a large net total of diffused error, its pixel value can easily become larger or smaller. Whether the pixel value becomes larger or smaller depends on whether the error values are positive or negative. Pixels receiving error diffusion from many corresponding points and pixels receiving error diffusion from few corresponding points occur cyclically. If diffusion coefficients of substantially identical values were to be applied to pixels irrespective of the number of corresponding points from which they receive error diffusion, pixels that would tend to be corrected to higher values, or lower pixel values, than other pixels would appear cyclically, creating a checkerboard-like pattern of variations in pixel value after the correction, sometimes causing unnatural results.

This problem is less likely to occur if comparatively large diffusion coefficients are specified for pixels receiving error diffusion from a comparatively small number of corresponding points.

The above condition can generally be satisfied by weighting the diffusion coefficients to decrease with increasing distance between the pixel to be corrected (the diffusion destination) and the corresponding point that is the source of the diffusion. The diffusion coefficients may, however, require additional adjustment on an individual basis.

The ranges of variation of i and j in equation (9) with Sx=2, Sy=2, Ha=1, Hb=1, Va=1, Vb=1 will be described with reference to FIG. 8.

Figure 8:
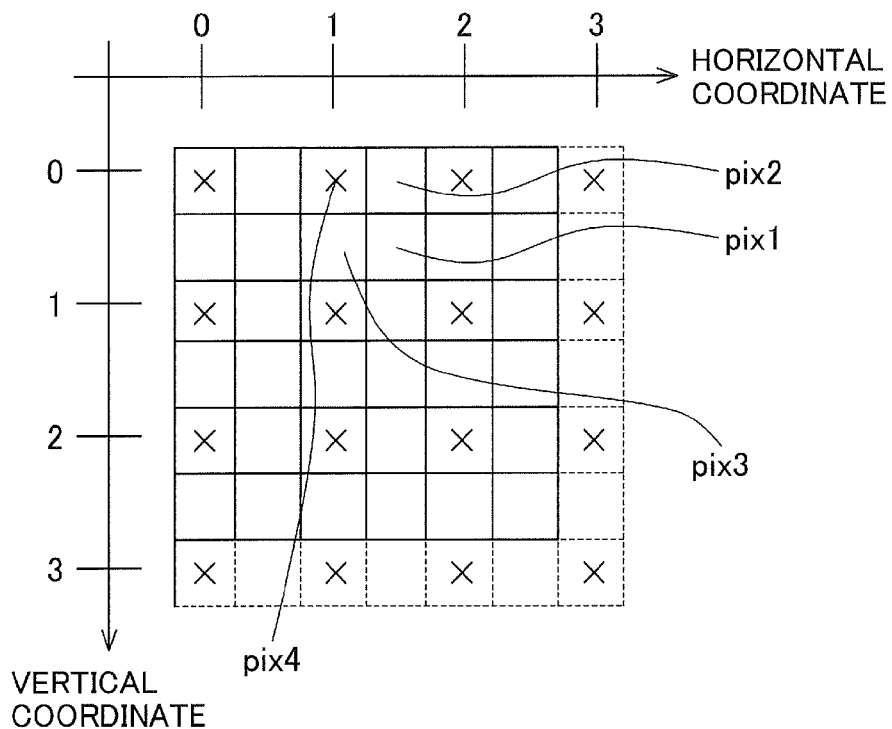
FIG. 8 shows the relative positions of corresponding points from which difference data are diffused to pixels to be corrected.

If the positional relationships between pixels to be corrected and corresponding points (represented by crosses in FIG. 8) from which error is diffused are used to classify the pixels in the edge-enhanced enlarged image, in the example shown in FIG. 8 there are four types: pixels pix1 receiving error diffusion from four corresponding points; pixels pix2 receiving error diffusion from two corresponding points on their left and right; pixels pix3 receiving error diffusion from two corresponding points above and below; and pixels pix4 receiving error diffusion from one corresponding point.

For the pix1 type where i=0 to 1 and j=0 to 1, equation (9) expands to the following equation:

$$D302(1.5, 0.5) = D200([1.5]+0, [0.5]+0) \cdot \quad (17)$$

$$K301\left(\begin{array}{c}[1.5]+0, [0.5]+0, 2\times 1.5 - [2([1.5]+0)] + \\ 1+1, 2\times 0.5 - [2([0.5]+0)] + 1 + 1\end{array}\right) +$$

$$D200([1.5]+1, [0.5]+0) \cdot$$

$$K301\left(\begin{array}{c}[1.5]+1, [0.5]+0, 2\times 1.5 - [2([1.5]+1)] + \\ 1+1, 2\times 0.5 - [2([0.5]+0)] + 1 + 1\end{array}\right) +$$

$$D200([1.5]+0, [0.5]+1) \cdot$$

-continued $$K301\begin{pmatrix}[1.5]+0, [0.5]+1, 2\times1.5-[2([1.5]+0)]+\\ 1+1, 2\times0.5-[2([0.5]+1)]+1+1\end{pmatrix}+$$

$$D200([1.5]+1, [0.5]+1)\cdot$$

$$K301\begin{pmatrix}[1.5]+1, [0.5]+1, 2\times1.5-[2([1.5]+1)]+\\ 1+1, 2\times0.5-[2([0.5]+1)]+1+1\end{pmatrix}$$

$$=D200(1,0)\cdot K301(1,0,3,3)+$$

$$D200(2,0)\cdot K301(1,0,1,3)+D200(1,1)\cdot$$

$$K301(1,1,3,1)+D200(2,1)\cdot K301(2,1,1,1)$$

For the pix2 type where i=0 to 1 and j=0, the expansion is:

$$D302(1.5, 0) = D200([1.5]+0, [0]+0)\cdot \quad (18)$$

$$K301\begin{pmatrix}[1.5]+0, [0]+0, 2\times1.5-[2([1.5]+0)]+\\ 1+1, 2\times0-[2([0]+0)]+1+1\end{pmatrix}+$$

$$D200([1.5]+1, [0]+0)\cdot$$

$$K301\begin{pmatrix}[1.5]+1, [0]+0, 2\times1.5-[2([1.5]+1)]+\\ 1+1, 2\times0-[2([0]+0)]+1+1\end{pmatrix}$$

$$=D200(1,0)\cdot K301(1,0,3,2)+D200(2,0)\cdot$$

$$K301(1,0,1,2)$$

For the pix3 type where i=0 and j=0 to 1, the expansion is:

$$D302(1, 0.5) = D200([1]+0, [0.5]+0)\cdot \quad (19)$$

$$K301\begin{pmatrix}[1]+0, [0.5]+0, 2\times1-[2([1]+0)]+\\ 1+1, 2\times0.5-[2([0.5]+0)]+1+1\end{pmatrix}+$$

$$D200([1]+0, [0.5]+1)\cdot$$

$$K301\begin{pmatrix}[1]+0, [0.5]+1, 2\times1-[2([1]+0)]+\\ 1+1, 2\times0.5-[2([0.5]+1)]+1+1\end{pmatrix}$$

$$=D200(1,0)\cdot K301(1,0,2,3)+D200(1,1)\cdot$$

$$K301(1,1,2,1)$$

For the pix4 type where i=0 and j=0, the expansion is:

$$D302(1,0)=D200([1]+0,[0]+0)\cdot K301([1]+0,[0]+0,2\times 1-[2([1]+0)]+1+1,2\times 0-[2([0]+0)]+1+1)=D200(1,0)\cdot K301(1,0,2,2) \quad (20)$$

In these equations (17) to (20), the ranges of i and j in equation (9) vary with the positional relationship between the corresponding points from which error is diffused and the pixel to be corrected. The ranges of i and j can be made the same, independent of the positional relationship between the corresponding points from which the error is diffused and the pixel to be corrected, by setting a limit condition such that when the last two terms in the parentheses following K301 lie outside of the range of elements of K301, the value of E301 becomes 0.

Since K301 is a 3×3 matrix in equations (17) to (20), if the values of the last two terms in the parentheses following K301 are integers from 1 to 3, they are inside the range of elements of K301. The condition that the value of K301 becomes 0 when the last two terms in the parentheses following K301 lie outside of the range of elements of K301 means that if K301 is written as K301(x, y, h, v), then $$K301(x,y,h,v)=0$$

when at least one of h and v has a value other than an integer from 1 to 3.

By using the same limit condition as for the pix1 type, i and j can be considered to vary within the range of i=0 to 1 and j=0 to 1 in equation (9) for the pix2, pix3, and pix4 types.

For the pix2 type, equation (9) then expands as follows.

$$D302(1.5, 0) = D200([1.5]+0, [0]+0)\cdot \quad (21)$$

$$K301\begin{pmatrix}[1.5]+0, [0]+0, 2\times1.5-[2([1.5]+0)]+\\ 1+1, 2\times0-[2([0]+0)]+1+1\end{pmatrix}+$$

$$D200([1.5]+1, [0]+0)\cdot$$

$$K301\begin{pmatrix}[1.5]+1, [0]+0, 2\times1.5-[2([1.5]+1)]+\\ 1+1, 2\times0-[2([0]+0)]+1+1\end{pmatrix}+$$

$$D200([1.5]+0, [0]+1)\cdot$$

$$K301\begin{pmatrix}[1.5]+0, [0]+1, 2\times1.5-[2([1.5]+0)]+\\ 1+1, 2\times0-[2([0]+1)]+1+1\end{pmatrix}+$$

$$D200([1.5]+1, [0]+1)\cdot$$

$$K301\begin{pmatrix}[1.5]+1, [0]+1, 2\times1.5-[2([1.5]+1)]+\\ 1+1, 2\times0-[2([0]+1)]+1+1\end{pmatrix}$$

$$=D200(1,0)\cdot K301(1,0,3,2)+D200(2,0)\cdot$$

$$K301(1,0,1,2)+D200(1,1)\cdot K301(1,1,3,0)+$$

$$D200(2,1)\cdot K301(2,1,1,0)$$

$$=D200(1,0)\cdot K301(1,0,3,2)+D200(2,0)\cdot$$

$$K301(1,0,1,2)$$

$$\because K301(1,1,3,0) = 0, K301(2,1,1,0) = 0$$

For the pix3 type, the expansion is:

$$D302(1, 0.5) = D200([1]+0, [0.5]+0)\cdot \quad (22)$$

$$K301\begin{pmatrix}[1]+0, [0.5]+0, 2\times1-[2([1]+0)]+\\ 1+1, 2\times0.5-[2([0.5]+0)]+1+1\end{pmatrix}+$$

$$D200([1]+0, [0.5]+1)\cdot$$

$$K301\begin{pmatrix}[1]+0, [0.5]+1, 2\times1-[2([1]+0)]+\\ 1+1, 2\times0.5-[2([0.5]+1)]+1+1\end{pmatrix}+$$

$$D200([1]+1, [0.5]+0)\cdot$$

$$K301\begin{pmatrix}[1]+1, [0.5]+0, 2\times1-[2([1]+1)]+\\ 1+1, 2\times0.5-[2([0.5]+0)]+1+1\end{pmatrix}+$$

$$D200([1]+1, [0.5]+1)\cdot$$

$$K301\begin{pmatrix}[1]+1, [0.5]+1, 2\times1-[2([1]+1)]+\\ 1+1, 2\times0.5-[2([0.5]+1)]+1+1\end{pmatrix}$$

$$=D200(1,0)\cdot K301(1,0,2,3)+D200(1,1)\cdot$$

$$K301(1,1,2,1)+D200(2,0)\cdot K301(2,0,0,3)+$$

$$D200(2,1)\cdot K301(2,1,0,1)$$

$$=D200(1,0)\cdot K301(1,0,2,3)+D200(1,1)\cdot$$

$$K301(1,1,2,1)$$

$$\because K301(2,0,0,3) = 0, K301(2,1,0,1) = 0$$

For the pix4 type, the expansion is:

$$D302(1, 0) = D200([1] + 0, [0] + 0) \cdot \qquad (23)$$
$$K301\begin{pmatrix} [1]+0, [0]+0, 2\times 1 - [2([1]+0)] + \\ 1+1, 2\times 0 - [2([0]+0)] + 1 + 1 \end{pmatrix} +$$
$$D200([1] + 1, [0] + 0) \cdot$$
$$K301\begin{pmatrix} [1]+1, [0]+0, 2\times 1 - [2([1]+1)] + \\ 1+1, 2\times 0 - [2([0]+0)] + 1 + 1 \end{pmatrix} +$$
$$D200([1] + 0, [0] + 1) \cdot$$
$$K301\begin{pmatrix} [1]+0, [0]+1, 2\times 1 - [2([1]+0)] + \\ 1+1, 2\times 0 - [2([0]+1)] + 1 + 1 \end{pmatrix} +$$
$$D200([1] + 1, [0] + 1) \cdot$$
$$K301\begin{pmatrix} [1]+1, [0]+1, 2\times 1 - [2([1]+1)] + \\ 1+1, 2\times 0 - [2([0]+1)] + 1 + 1 \end{pmatrix}$$
$$= D200(1, 0) \cdot K301(1, 0, 2, 2) + D200(2, 0) \cdot$$
$$K301(2, 0, 0, 2) + D200(1, 1) \cdot K301(1, 1, 2, 0) +$$
$$D200(2, 1) \cdot K301(2, 1, 0, 0)$$
$$= D200(1, 0) \cdot K301(1, 0, 2, 2)$$
$$\because K301(2, 0, 0, 2) = 0, K301(1, 1, 2, 0) = 0,$$
$$K301(2, 1, 0, 0) = 0$$

The same range of i and j (i=0 to 1, j=0 to 1) can then be specified for all types, including the pix1 type.

The explanation above can be generalized as follows: if the range of summation over i in equation (9) (the range of variation of i) is Sa to Sb and the range of summation over j in equation (9) (the range of variation of j) is Ta to Tb, then Sa, Sb, Ta, and Tb are given, for example, as follows.

$Sa=-[Hb/Sx]$ $Sb=[(Ha/Sx)+1]$ $Ta=-[Vb/Sy]$ $Tb=[(Va/Sy)+1]$

Even when i and j are within the ranges given above, if the result of calculation of the last two terms in the parentheses following K301 lies outside the range of elements of K301, the value of K301 must be zero.

Referring again to FIG. 5, the subtractor 303 outputs a difference-corrected image D303 in which the pixel values are obtained by subtracting the difference diffusion quantity D302(x, y) calculated for each pixel P100(x, y) from the pixel value D100(x, y) of pixel P100(x, y) in the edge-enhanced enlarged image D100. If the pixel at coordinates (x, y) in the difference-corrected image D303 is denoted P303(x, y) and the pixel value of pixel P303(x, y) is denoted D303(x, y), then:

$D303(x,y)=D100(x,y)-D302(x,y)$

The high-resolution image corrector 300 outputs the difference-corrected image D303 as the output image D300.

The effects of the image processing device in this embodiment are as follows.

Image processing devices proposed previously output an edge-enhanced enlarged image to correct blur in an enlarged image. The process of outputting an edge-enhanced enlarged image will be referred to as an edge-enhanced image enlargement process.

Conventional image processing devices that output an edge-enhanced enlarged image tend to increase the values of pixels having values higher than the local average of the pixels around them and decrease the values of pixels having values lower than the local average of the pixels around them.

By increasing the values of pixels having values higher than the local average of the pixels around them and decreasing the values of pixels having values lower than the local average of the pixels around them, edges are made sharper and blur in the enlarged image is eliminated.

When the values of pixels having values higher than the local average of the pixels around them are increased and the values of pixels having values lower than the local average of the pixels around them are decreased, however, the result of this processing may look unnatural in areas lacking edges.

In textured areas, for example, increasing the values of pixels having values higher than the local average of the pixels around them and decreasing the values of pixels having values lower than the local average of the pixels around them divides the pixels into two classes, one having high values and the other having low values, so that fine patterns become indiscernible and the resolution appears to be reduced.

These textured areas express the texture of the subject, for example, and have pixel values that vary on a fine scale. Textured areas thus include pixels having a variety of pixel values with many local variations in pixel value. In these areas, many pixels have pixel values differing to some extent from the pixel values of adjacent pixels.

Figure 9:
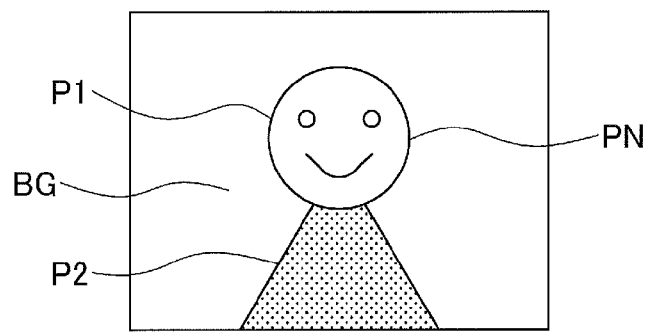
FIG. 9 shows an exemplary image including edges and a textured area.

FIG. 9 illustrates edges and a textured area.

An edge is a boundary between one subject in the picture and another, as at P1 in FIG. 9. Edge P1 represents the boundary between a person and the background. In areas including edges, the edge divides the pixels into two classes, one having values higher than the local average of the pixels around them and the other having values lower than the local average of the pixels around them. The greater the difference is between the values of pixels having values higher than the local average of the pixels around them and the values of pixels having values lower than the local average of the pixels around them, the sharper the edges appear to be and the higher the perceived resolution of the image seems to be.

A textured area is a fine-pattern area in a single subject, as at P2 in FIG. 9. Textured area P2 represents clothing having a fine pattern. As stated above, textured areas include many local variations in pixel value. If pixels having a variety of pixel values are included in a textured area, it appears to have a fine pattern and the image appears to have high resolution.

It is better for pixels having a variety of pixel values to appear in textured areas, to make it seem to have a fine pattern as stated above, than to have the pixels divided into two classes, one with high values and the other with low values.

It thus occurred to the present inventors that even in areas lacking edges, the perceived resolution could be improved by creating pixels having a variety of pixel values.

A particular idea that occurred was to create pixels having a variety of pixel values by utilizing the differences between the input image D0 and the edge-enhanced enlarged image D100.

Aside from having a different number of pixels, the edge-enhanced enlarged image D100 should match the input image D0.

If the edge-enhanced enlarged image D100 is assumed to have pixels of the same size as the pixels P0(x, y) in the input image D0 in corresponding positions, the values calculated for the assumed pixels, i.e., the corresponding-point pixel values D223(x, y), should match the pixel values D0(x, y).

In an edge-enhanced enlarged image created without consideration of this point, the values do not always match.

For example, if the values D100(x, y) of many pixels in the vicinity of the assumed position of a pixel having the same size as pixel P0(x, y) are higher than the local average of the pixels around them because of the edge-enhancement and enlargement process, their corresponding-point pixel values D223(x, y) will tend to be higher than the pixel values D0(x, y), and if the values D100(x, y) of many pixels are lower than the local average of the pixels around them because of the edge-enhancement and enlargement process, their corresponding-point pixel values D223(x, will tend to be lower than the pixel values D0(x, y).

The idea is to increase the perceived resolution of the image by using these differences that arise between the pixel values D0(x, y) and the corresponding-point pixel values D223(x, y) to create pixels having a variety of pixel values.

The high-resolution image corrector 300 was accordingly adapted so that in correcting the edge-enhanced enlarged image D100 to cancel out the difference data D200 at least partially, it varies the degree of correction from pixel to pixel, to create pixels having a variety of pixel values.

Subtracting the difference diffusion quantity D302 from the edge-enhanced enlarged image D100 is equivalent to obtaining different difference diffusion coefficients K301 for different corresponding points T and using the obtained difference diffusion coefficients K301 to diffuse the difference data D200 to pixels P100 in the vicinity of the corresponding points T. The degree of correction of the pixel value thus varies among different pixels P100, and pixels having a variety of pixel values are created, increasing the perceived resolution in textured areas.

Pixels having a variety of pixel values may also be created by, for example, adding random values given by random numbers to the pixel values of pixels P100 in the edge-enhanced enlarged image D100.

If the differences between the input image D0 and edge-enhanced enlarged image D100 are obtained as difference data D200 and if the edge-enhanced enlarged image D100 is corrected to cancel out the differences expressed by the difference data D200, at least partially, and is output as an output image D300, however, then if the output image D300 is assumed to have pixels of the same size as the pixels P0(x, y) in the input image D0 in the same positions as pixels P0(x, y), the values obtained by calculating the pixel values of these pixels approach the pixel values D0(x, y) of pixels P0(x, y). In other words, when pixels having a variety of pixel values are created in this way, they look more natural than pixels created by adding random values to the pixel values of pixels P100 in the edge-enhanced enlarged image D100, because aside from having different numbers of pixels, the input image D0 and the output image D300 have similar properties (or have similar averages of local pixel values).

Figure 10:
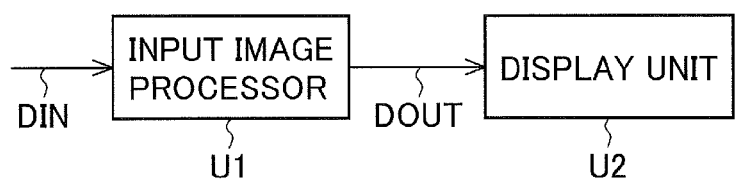
FIG. 10 is a block diagram of an image display device including the image processing device in FIG. 1.

The image processing device in this embodiment can be used as part of an image display device. FIG. 10 shows an exemplary image display device including the image processing device in this embodiment. The image display device includes an input image processor U1 and a display unit U2, which displays an output image DOUT corresponding to an input image DIN. The input image processor U1 includes the image processing device in this embodiment. If the number of pixels in the input image DIN is smaller than the number of pixels displayed by the display unit U2, the image processing device in this embodiment enlarges the input image DIN and outputs the result as the output image DOUT. This operation makes it possible to display a visually pleasing image even when the number of pixels in the input image DIN is less than the number of pixels output by the display unit U2.

One can conceive of various alterations that can be made to the image processing device in this embodiment without departing from its gist.

In the example above, four two-dimensional matrices An are used to determine the difference diffusion coefficient K301, but the number of two-dimensional matrices is not limited to four. The method of determining the coefficients bn can be altered in various ways, depending on the number of two-dimensional matrices An used.

If five two-dimensional matrices are used, the following coefficient, for example, may be used in addition to the coefficients bn (n=1 to 4) given by the equations (7).

$$b5=(b1+b2+b3+b4)/4 \quad (24)$$

If eight two-dimensional matrices are used, the coefficients may be, for example:

$$b1(x,y)=|D0(x,y)-D0(x-1,y-1)|$$

$$b2(x,y)=|D0(x,y)-D0(x,y-1)|$$

$$b3(x,y)=|D0(x,y)-D0(x+1,y-1)|$$

$$b4(x,y)=|D0(x,y)-D0(x-1,y)|$$

$$b5(x,y)=|D0(x,y)-D0(x+1,y)|$$

$$b6(x,y)=|D0(x,y)-D0(x-1,y+1)|$$

$$b7(x,y)=|D0(x,y)-D0(x,y+1)|$$

$$b8(x,y)=|D0(x,y)-D0(x+1,y+1)| \quad (25)$$

If nine two-dimensional matrices are used, the following coefficient, for example, may be used in addition to the coefficients bn (n=1 to 8) given by equations (25).

$$b9=(b1+b2+b3+b4+b5+b6+b7+b8)/8 \quad (26)$$

The way of determining the coefficients bn from the pixel values of pixels P0 in the input image D0 is not limited to the use of the differences in pixel value among pixels P0 in the input image D0 as in the description above.

In the description above, N different coefficients bn are determined for individual corresponding points T by using the pixel values of pixels P0 in the input image D0. It is not absolutely necessary, however, to use the pixel values of pixels P0 in the input image D0 to determine the coefficients bn. For example, N different coefficients bn for individual corresponding points T can be determined by using random numbers.

When the difference diffusion coefficients K301 are obtained by weighted addition of N matrices An, they may be normalized by the total sum of the coefficients bn as follows.

$$K301 = \sum_{n=1}^{N} bn \cdot An \bigg/ \sum_{n=1}^{N} bn \quad (27)$$

The edge-enhancing image enlarger 100 may use any known method that outputs an enlarged image in which edges in the input image D0 are enhanced.

Figure 11:
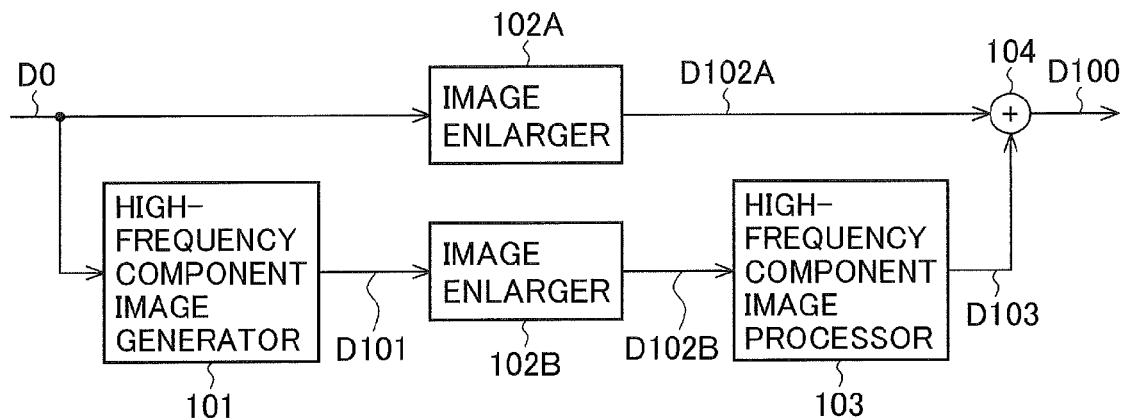
FIG. 11 is a block diagram showing an example of the structure of the edge-enhancing image enlarger 100 in FIG. 1.

FIG. 11 shows an example of the structure of the edge-enhancing image enlarger 100 disclosed in U.S. Patent Application Publication No. 2010/0134518. The edge-enhancing image enlarger 100 includes a high-frequency component image generator 101, a pair of image enlargers 102A, 102B, a high-frequency component image processor 103, and an adder 104. Image enlarger 102A creates an enlarged image D102A by enlarging the input image D0. The high-frequency component image generator 101 creates a high-frequency component image D101 by extracting a high-frequency component from the input image D0. Image enlarger 102B creates an enlarged image D102B by enlarging the high-frequency component image D101 output from the high-frequency component image generator 101. The high-frequency component image processor 103 creates a high-frequency component image D103 by extracting a high-frequency component from an image obtained by nonlinear processing on the enlarged image D102B output from image enlarger 102B. The adder 104 adds enlarged image D102A and high-frequency component image D103 and outputs an edge-enhanced enlarged image D100.

In the nonlinear processing performed in the high-frequency component image processor 103, for example, the pixel values of pixels (pixels in the high-frequency component image) in a given area including a zero crossing point in the enlarged image D102B are amplified by an amplification factor greater than '1', and the pixel values of the other pixels are left as they are.

As disclosed in U.S. Patent Application Publication No. 2010/0134518, an edge-enhanced enlarged image can be output by the processing described above.

The structure of the edge-enhancing image enlarger 100 may differ from the structure described above. The input image D0 may be simply enlarged and then passed through a known edge enhancement filter such as an unsharp mask, and the resultant image may be output. This process also produces an edge-enhanced enlarged image.

Various other methods that output an edge-enhanced enlarged image by enlarging an image while enhancing edges or by enhancing edges after enlarging the image are also known. Any of these methods may be used without restriction.

Embodiment A2

Like the image processing device in embodiment A1, the image processing device in embodiment A2 can be implemented by the structure shown in FIG. 1. The structure and operation of the high-resolution image corrector 300 are different, however, from those of the image processing device in embodiment A1. Like the image processing device in embodiment A1, the image processing device in embodiment A2 can also be used as part of an image display device.

Figure 12:
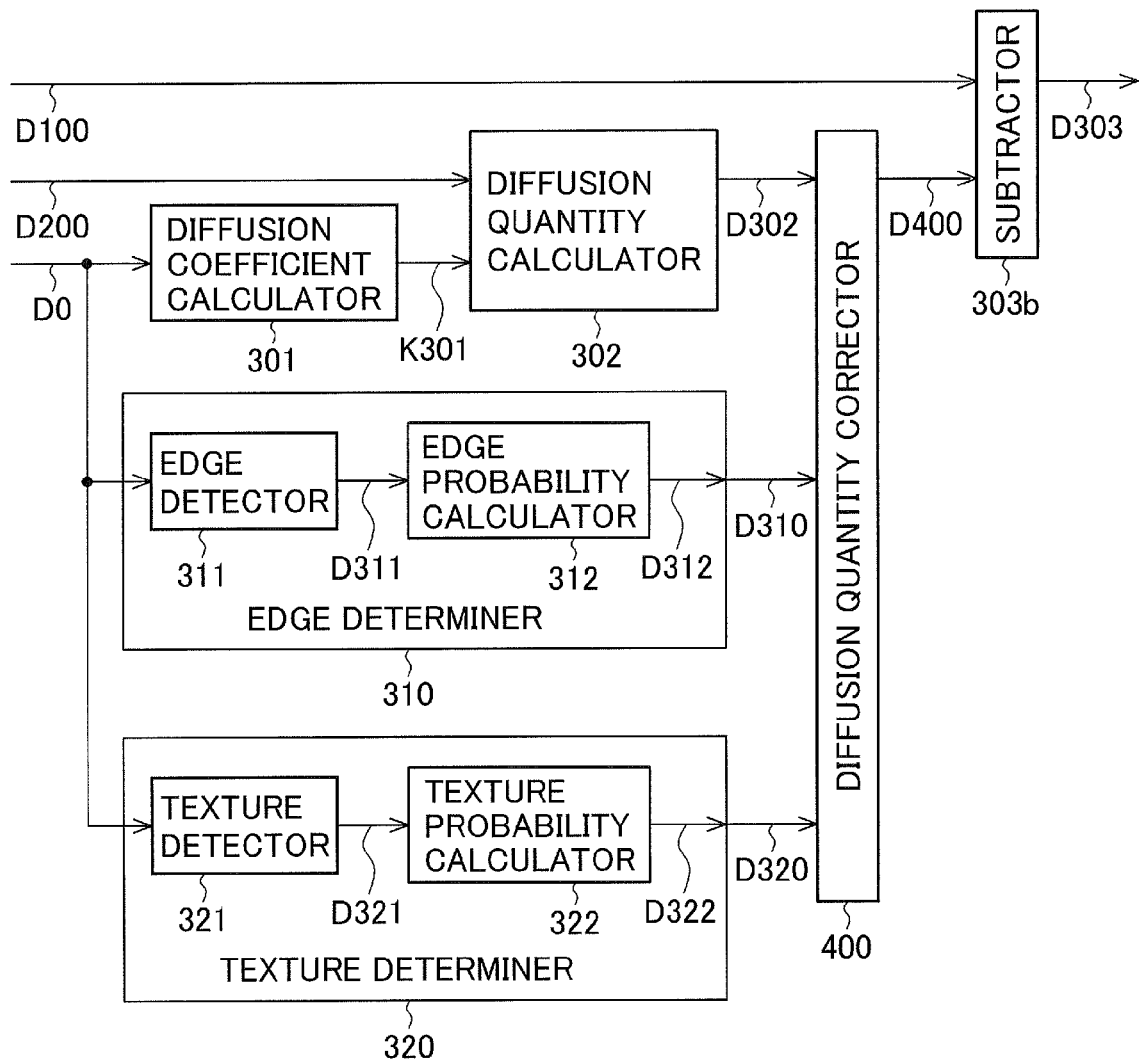
FIG. 12 is a block diagram showing an example of the structure of the high-resolution image corrector 300 in FIG. 12, as used in embodiment A2 of the invention.

FIG. 12 shows an example of the structure of the high-resolution image corrector 300 in embodiment A2.

The high-resolution image corrector 300 in FIG. 12 includes a diffusion coefficient calculator 301, a diffusion quantity calculator 302, an edge determiner 310, a texture determiner 320, a diffusion quantity corrector 400, and a subtractor 303b.

As the diffusion coefficient calculator 301 and diffusion quantity calculator 302, the same components may be used as described with reference to FIG. 5 in embodiment A1.

The edge determiner 310 obtains a value indicating the probability that each pixel P100(x, y) in the edge-enhanced enlarged image D100 lies in an edge or an area close to an edge (edge area) and outputs the result as an edge determination result D310. The edge determination result D310 obtained for pixel P100(x, y) will be denoted D310(x, y).

The edge determiner 310 includes an edge detector 311 and an edge probability calculator 312, as shown in FIG. 12.

The edge detector 311 detects places where the pixel value changes abruptly in the input image D0, such as at the outlines of a subject, as edges.

Figure 13:
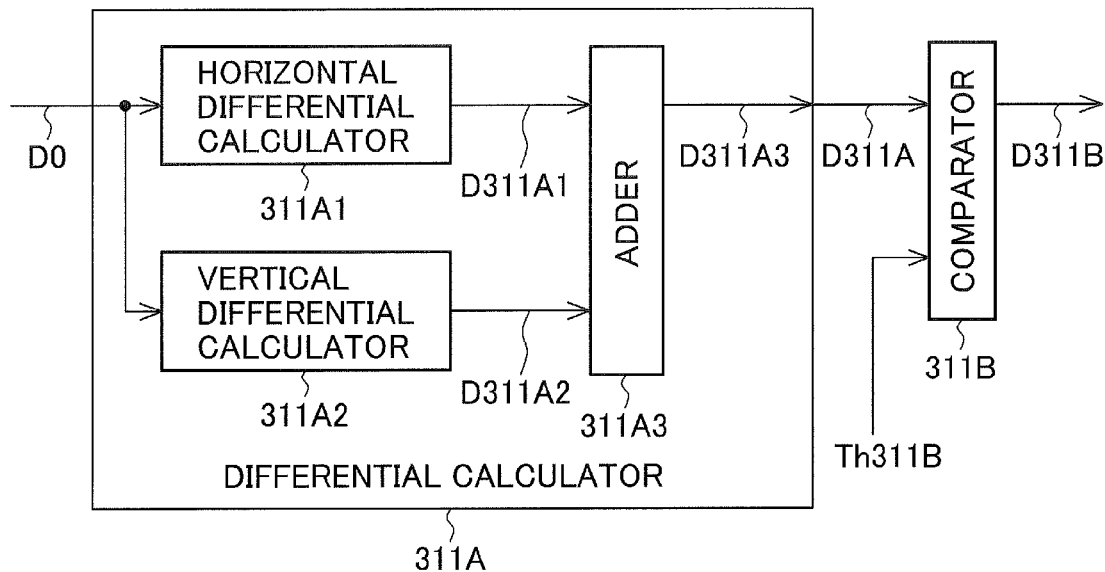
FIG. 13 is a block diagram showing an example of the structure of the edge detector 311 in FIG. 12.

FIG. 13 shows an example of the structure of the edge detector 311. The illustrated edge detector 311 includes a differential calculator 311A and a comparator 311B.

For each pixel P0 in the input image D0, the differential calculator 311A calculates a differentiated pixel value or differential value D311A.

The calculation of the differential value D311A by use of a Sobel filter will now be described. In this case, the differential calculator 311A includes a horizontal differential calculator 311A1, a vertical differential calculator 311A2, and an adder 311A3.

The horizontal differential calculator 311A1 calculates a horizontal differential value D311A1 by using a horizontal Sobel filter. If the horizontal differential value D311A1 calculated for pixel P0(x, y) is denoted D311A1(x, y), it is expressed as follows.

$$D311A1(x,y)=P0(x+1,y-1)-P0(x-1,y-1)+ \\ 2(P0(x+1,y)-P0(x-1,y))+P0(x+1,y+1)-P0(x-1, \\ y+1) \quad (28)$$

The vertical differential calculator 311A2 calculates a vertical differential value D311A2 by using a vertical Sobel filter. If the vertical differential value D311A2 calculated for pixel P0(x, y) is denoted D311A2(x, y), it is expressed as follows.

$$D311A2(x,y)=P0(x-1,y+1)-P0(x-1,y-1)+2(P0(x,y+ \\ 1)-P0(x,y-1))+P0(x+1,y+1)-P0(x+1,y-1) \quad (29)$$

The adder 311A3 adds the absolute value of the horizontal differential value D311A1 and the absolute value of the vertical differential value D311A2 and outputs the sum as a differential value D311A3. If the differential value D311A3 calculated for pixel P0(x, y) is denoted D311A3(x, y), this is expressed as follows.

$$D311A3(x,y)=|D311A1(x,y)|+|D311A2(x,y)|$$

The differential calculator 311A outputs differential value D311A3 as differential value D311A.

The comparator 311B decides whether each pixel P0 is included in an edge area (an edge or an area close to an edge) and outputs the result as a decision result D311B.

At edges, pixel values change abruptly, so that the differential value of the pixel value increases. If the absolute value of the differential value D311A calculated for pixel P0 is equal to or greater than a threshold Th311B, it can be concluded that the pixel is part of an edge. If the differential value D311A calculated for pixel P0(x, y) is denoted D311A(x, y) and the decision result D311B is denoted D311B(x, y), this is expressed as follows.

$$D311B(x, y) = \begin{cases} 1 & \text{if}(D311A(x, y) \geq Th311B) \\ 0 & \text{else} \end{cases} \quad (30)$$

That is, when D311B(x, y) is '1', pixel P0(x, y) is included in an edge.

The edge detector 311 outputs the decision result D311B as an edge detection result D311.

The edge detector 311 selects each pixel P0 in the input image D0 as a pixel of interest and detects those pixels of interest at which the differential value of the pixel value is equal to or greater than a fixed value as belonging to an edge.

The edge probability calculator 312 derives an edge probability D312, which indicates the probability that pixel P100 in the edge-enhanced enlarged image D100 lies in an edge area.

An exemplary method of determining the edge probability D312 is described below.

The input image D0 and the edge-enhanced enlarged image D100 are images of the same subject. A place determined to be an edge in the input image D0 can be determined to be an edge in the edge-enhanced enlarged image D100 as well. That is, if a pixel P0 in the input image D0 lies in an edge and if a pixel P100 in the edge-enhanced enlarged image D100 lies near pixel P0 when the input image D0 is superimposed on the edge-enhanced enlarged image D100, then it is highly probable that pixel P100 lies in an edge or an area near an edge (an edge area). If pixel P100 lies in an edge area, nearby pixels P0 in its vicinity are likely to be included in the edge, and the edge detection result D311 will frequently have the value '1'. Furthermore, if a pixel P100 lies in an edge area, the value obtained by adding the edge detection results D311 calculated for nearby pixels P0 is likely to be high. Therefore, as the value obtained by adding the edge detection results D311 calculated for pixels P0 in the vicinity of pixel P100 increases, the possibility that pixel P100 lies in an edge area becomes greater.

The argument above indicates that the edge probability D312 can be obtained by adding the edge detection results D311 calculated for pixels P0 in the input image D0 in a vicinity, when the input image D0 is superimposed on the edge-enhanced enlarged image D100, of pixel P100 in the edge-enhanced enlarged image D100.

Pixels P0 in the vicinity of pixel P100(x, y) are expressed as follows by using integers i and j.

$$P0([x]+i, [y]+j)$$

The edge detection results D311 calculated for these pixels P0 are expressed as follows.

$$D311([x]+i, [y]+j)$$

The edge probability D312 of pixel P100(x, y), which will be denoted D312(x, y), is therefore expressed as follows.

$$D312(x, y) = \sum_{i=-Ic}^{Id} \sum_{j=-Jc}^{Jd} D311([x] + i, [y] + j) \quad (31)$$

The equation above indicates that the edge probability D312 (x, y) is obtained by adding the edge detection results D311 obtained in a zone around pixel P0([x], [y]) extending Ic pixels to the left and Id pixels to the right in the horizontal direction, and Jc pixels above and Jd pixels below in the vertical direction. As indicated by the argument above, the larger the value of the edge probability D312 is, the greater the possibility that pixel P100 lies in an edge area becomes.

The edge determiner 310 outputs the edge probability D312 as an edge determination result D310.

The edge determination result D310 of each pixel P100 in the edge-enhanced enlarged image D100 can be obtained on the basis of the edge detection result D311.

Next the operation of the texture determiner 320 will be described.

For each pixel P100(x, y) in the edge-enhanced enlarged image D100, the texture determiner 320 obtains a value indicating the probability that pixel P100(x, y) lies in a textured area and outputs the result as a texture determination result D320. The texture determination result D320 obtained for pixel P100(x, y) will be denoted D320(x, y).

As shown in FIG. 12, the texture determiner 320 has a texture detector 321 and a texture probability calculator 322.

The texture detector 321 detects an area including many local variations in pixel value in the input image D0 as a textured area.

Figure 14:
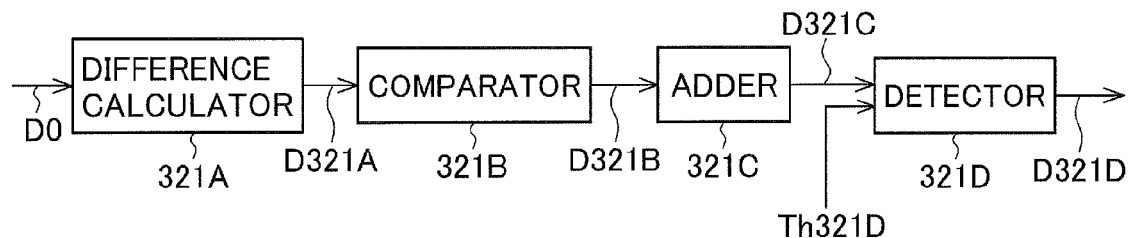
FIG. 14 is a block diagram showing an example of the structure of the texture detector 321 in FIG. 12.

FIG. 14 shows an example of the structure of the texture detector 321. The illustrated texture detector 321 includes a difference calculator 321A, a comparator 321B, an adder 321C, and a detector 321D.

For each pixel P0 in the input image D0, the difference calculator 321A calculates the differences in pixel value between it and adjacent pixels and outputs the result as a set of difference values D321A.

The difference values D321A calculated for pixel P0(x, y) will be denoted D321A(x, y). D321A(x, y) includes, for example, the following differences.

$$D321A1(x,y) = P0(x,y) - P0(x-1, y-1)$$

$$D321A2(x,y) = P0(x,y) - P0(x, y-1)$$

$$D321A3(x,y) = P0(x,y) - P0(x+1, y-1)$$

$$D321A4(x,y) = P0(x,y) - P0(x-1, y)$$

$$D321A5(x,y) = P0(x,y) - P0(x+1, y)$$

$$D321A6(x,y) = P0(x,y) - P0(x-1, y+1)$$

$$D321A7(x,y) = P0(x,y) - P0(x, y+1)$$

$$D321A8(x,y) = P0(x,y) - P0(x+1, y+1) \quad (32)$$

The comparator 321B counts the number of differences D321Ar(x, y) (r is an integer from 1 to 8) the absolute value of which is not lower than a threshold Th321B, among the difference values D321A(x, y) calculated for each pixel P0(x, y), and outputs the count as a count D321B(x, y). The count D321B(x, y) may be denoted simply count D321B.

The adder 321C adds the counts D321B calculated for pixels P0 in the vicinity of each pixel P0 in the input image D0 and outputs the result as a sum D321C. If the sum D321C calculated for pixel P0(x, y) is denoted D321C(x, y), this is expressed as follows.

$$D321C(x, y) = \sum_{i=Ie}^{If} \sum_{j=-Je}^{Jf} D321B(x + i, y + j) \quad (33)$$

The equation above means that the sum D321C(x, y) is determined by adding the counts D321B obtained in a zone around pixel P0(x, y) extending Ie pixels to the left and If pixels to the right in the horizontal direction, and Je pixels above and Jf pixels below in the vertical direction.

The detector 321D decides whether each pixel P0 lies in a textured area and outputs the result as a detection result D321D.

Since a textured area includes many local variations in pixel value, there are many pixels that differ in pixel value to some extent from their adjacent pixels, so that count D321B is likely to have a high value in textured areas. Since the sum D321C is determined by addition of counts D321B, the sum D321C is also likely to have a high value in textured areas. If the value of the sum D321C calculated for pixel P0 is not lower than the threshold Th321D, it can therefore be decided that the pixel lies in a textured area. If the detection result D321D calculated for pixel P0(x, y) is denoted D321D(x, y), this is expressed as follows.

$$D321D(x, y) = \begin{cases} 1 & \text{if}(D321C(x, y) \geq Th321D) \\ 0 & \text{else} \end{cases} \quad (34)$$

Thus a detection result D321D(x, y) of '1' indicates that pixel P0(x, y) lies in a textured area.

The texture detector 321 outputs the detection result D321D as a texture detection result D321.

The texture detector 321 selects each pixel P0 in the input image D0 as a pixel of interest and detects an area in the vicinity of the pixel of interest including many pixels that differ in pixel value to some extent from their adjacent pixels as a textured area.

The texture probability calculator 322 determines a texture probability D322 indicating the probability that pixel P100 in the edge-enhanced enlarged image D100 lies in a textured area.

The way of determining the texture probability D322 will now be described.

From an argument similar to that given for the derivation of the edge probability D312 from the edge detection result D311, it follows that the texture probability D322 can be obtained by adding the texture detection results D321 calculated for pixels P0 in the input image D0 in the vicinity, when the input image D0 is superimposed on the edge-enhanced enlarged image D100, of pixel P100 in the edge-enhanced enlarged image D100.

Pixels P0 in the vicinity of pixel P100(x, y) are expressed as follows by using integers i and j.

$$P0([x]+i, [y]+j)$$

The texture detection result D321 calculated for these pixels P0 is expressed as follows $$D321([x]+i, [y]+j)$$

If the texture probability D322 obtained for pixel P100(x, y) is denoted D322(x, y), then:

$$D322(x, y) = \sum_{i=-Ig}^{Ih} \sum_{j=-Jg}^{Jh} D321([x] + i, [y] + j) \quad (35)$$

The equation above means that the texture probability D322 (x, y) is determined by adding the texture detection results D321 obtained in a zone around pixel P0([x], [y]) extending Ig pixels to the left and Ih pixels to the right in the horizontal direction, and Jg pixels above and Jh pixels below in the vertical direction. As is clear from the argument above, the larger the value of the texture probability D322 is, the greater the possibility that pixel P100 lies in a textured area becomes.

The texture determiner 320 outputs the texture probability D322 as a texture determination result D320.

For each pixel P100 in the edge-enhanced enlarged image D100, the texture determination result D320 can be determined on the basis of the texture detection result D321.

The diffusion quantity corrector 400 obtains a corrected diffusion quantity D400 on the basis of the difference diffusion quantity D302, edge determination result D310, and texture determination result D320.

The diffusion quantity corrector 400 determines a correction coefficient F310 for each pixel P100 in the edge-enhanced enlarged image D100. The correction coefficient F310 calculated for pixel P100(x, y) will be denoted F310(x, y). This correction coefficient F310(x, y) is determined in accordance with the value of the edge determination result D310(x, y). For example, correction coefficient F310(x, y) is obtained in such a way that it decreases monotonically with respect to the value of the edge determination result D310(x, y).

The diffusion quantity corrector 400 also determines a correction coefficient F320 for each pixel P100 in the edge-enhanced enlarged image D100. The correction coefficient F320 calculated for pixel P100(x, y) will be denoted F320(x, y). Correction coefficient F320(x, y) is determined in accordance with the value of the texture determination result D320 (x, y). For example, correction coefficient F320(x, y) is obtained in such a way that it increases monotonically with respect to the value of the texture determination result D320 (x, y).

The diffusion quantity corrector 400 further derives a corrected diffusion quantity D400 for each pixel P100 in the edge-enhanced enlarged image D100 by correcting the difference diffusion quantity D302 in accordance with the values of the correction coefficients F310, F320. The corrected difference diffusion quantity may be referred to below simply as the corrected diffusion quantity. The correction is made, for example, by multiplying the difference diffusion quantity D302 by the correction coefficients F310, F320. If the corrected diffusion quantity D400 calculated for pixel P100(x, y) is denoted D400(x, y), this is expressed as follows.

$$D400(x,y) = F310(x,y) \times F320(x,y) \times D302(x,y)$$

The subtractor 303b outputs a difference-corrected image D303 in which the pixel values are obtained by subtracting the corrected diffusion quantity D400(x, y) calculated for each pixel P100(x, y) from the pixel value D100(x, y) of pixel P100(x, y) in the edge-enhanced enlarged image D100. Pixel values D303(x, y) in the difference-corrected image D303 are thus expressed as follows.

$$D303(x,y) = D100(x,y) - D400(x,y)$$

The high-resolution image corrector 300 outputs the difference-corrected image D303 as the output image D300.

The diffusion quantity calculator 302 in this embodiment differs from the diffusion quantity calculator 302 in embodiment A1 in that the diffusion allocations of the difference data D200 vary with the correction coefficients F310, F320 as well as with the difference diffusion coefficients K301.

In particular, when it is highly probable that a pixel P100 lies in an edge area, the diffusion of its difference data D200 is restrained (limited or reduced) by varying the corrected diffusion quantity D400 according to correction coefficient F310. This makes it possible to improve the perceived resolution in textured areas while preserving as much of the effect of edge enhancement in the edge-enhancing image enlarger 100 as possible.

When it is highly probable that a pixel P100 lies in a textured area, the diffusion of its difference data D200 is performed (not inhibited) by varying the corrected diffusion quantity D400 according to correction coefficient F320. This can also restrain the diffusion of difference data D200 in areas, typically edge areas, that lie outside textured areas, so that the perceived resolution in textured areas can be improved while preserving the effect of edge enhancement in the edge-enhancing image enlarger 100.

Therefore, the image processing device in this embodiment can improve the perceived resolution in textured areas while preserving the effect of edge enhancement in the edge-enhancing image enlarger 100.

The perceived resolution in textured areas can be improved while preserving the effect of edge enhancement in the edge-enhancing image enlarger 100 by using at least one of the correction coefficients F310, F320.

The process of varying the value of the corrected diffusion quantity D400 based on correction coefficient F310 could also be described as a process of having the edge detector 311 detect edges included in the input image D0 and restraining the corrected diffusion quantity D400 so that it does not become large in areas close, when the input image D0 is superimposed on the edge-enhanced enlarged image D100, to the positions where edges are detected by the edge detector 311.

The process of varying the value of the corrected diffusion quantity D400 based on correction coefficient F310 could in addition be described as a process of having the edge determiner 310 detect positions where edges are included in the edge-enhanced enlarged image D100 and restraining the corrected diffusion quantity D400 so that it does not become large in areas close to the positions where edges are detected, including the positions where the edges are detected and areas peripheral thereto.

The process of varying the value of the corrected diffusion quantity D400 based on correction coefficient F320 could also be described as a process of having the texture detector 321 detect textured areas in the input image D0 and restraining the corrected diffusion quantity D400 so that it does not become large outside areas close, when the input image D0 is superimposed on the edge-enhanced enlarged image D100, to the positions detected as textured areas by the texture detector 321.

The process of varying the value of the corrected diffusion quantity D400 with the correction coefficient F320 could in addition be described as a process of detecting locations containing texture in the edge-enhanced enlarged image D100 by the texture determiner 320 and restraining the corrected diffusion quantity D400 so that it does not become large outside areas near the locations decided to include texture, that is, outside the locations decided to include texture and their peripheral areas.

The process of varying the value of the corrected diffusion quantity D400 with the correction coefficient F320 could in addition be described as a process of having the texture determiner 320 detect areas including many local variations in pixel value in the edge-enhanced enlarged image D100 as textured areas and restraining the corrected diffusion quantity D400 so that it does not become large outside the textured areas and areas peripheral thereto.

One can conceive of various alterations that can be made to the image processing device in this embodiment without departing from its gist. To begin with, the same alterations as described in embodiment A1 may be made.

Furthermore, some of the processes represented as simple addition, as in equations (31), (33), and (35), may be changed to weighted addition.

Edge detection accuracy can be improved by carrying out an isolated-point removal process on the edge detection result D311. A median filter, for example, or a morphological operation combining contraction and expansion processes may be used in the isolated-point removal process.

The texture detection accuracy in the texture detection result D321 can also be improved by use of an isolated-point removal process.

Effects similar to those described above can be obtained by performing the isolated-point removal process on the edge probability D312 or texture probability D322, instead of the edge detection result D311 or texture detection result D321.

Any known edge detection filter may be used instead of the Sobel filter used in the example described above. Other known methods of detecting edges may also be used.

The process of detecting textured areas may be any process that can detect areas including many local variations in pixel value. Pixel value differences other than the difference indicated in equation (32) may be used, provided the above object can be attained.

Alternatively, a Fourier transform may be carried out on a local area including pixel P0, and a greater high-frequency content may be taken as indicating a greater possibility that the area is a textured area. Furthermore, any process that can decompose a signal into frequency components, such as a discrete cosine transform or a wavelet transform, may be used instead of a Fourier transform.

Still other known methods that can detect areas including many local variations in pixel value may be used.

The correction of the difference diffusion quantity D302 in accordance with the correction coefficients F310, F320 need not be carried out as described above. Any method that can correct the texture determination result D320 to a small value in edge areas, or areas outside textured areas, may be used.

Correction coefficient F310 need not decrease monotonically with respect to the edge determination result D310; it need only have a value less than 1 (or a value that can correct the difference diffusion quantity D302 by reducing it) in at least some sections where, for example, the edge determination result D310 exceeds a given threshold.

The correction coefficient F320 need not increase monotonically with respect to the texture determination result D320; it need only have a value less than 1 (or a value that can correct the difference diffusion quantity D302 by reducing it) in at least some sections where, for example, the texture determination result D320 falls below a given threshold.

The calculation for correcting the difference diffusion quantity D302 is not limited to multiplication by the correction coefficients F310 and F320. For example, the corrected diffusion quantity D400 may be obtained by subtracting, from the difference diffusion quantity D302, a correction value that increases as the value of the edge determination result D310 increases, or that decreases as the value of the texture determination result D320 increases.

Alternatively, a process may be performed to decrease the corrected diffusion quantity D400 to a value smaller than the difference diffusion quantity D302 in at least some sections where, for example, the edge determination result D310 exceeds a given threshold, or to decrease the corrected diffusion quantity D400 to a value smaller than the difference diffusion quantity D302 in at least some sections where, for example, the texture determination result D320 falls below a given threshold.

The correction of the difference diffusion quantity D302 in accordance with the edge determination result D310 and texture determination result D320 thus need only restrain large values of the corrected diffusion quantity D400 in edge areas, or in areas outside textured areas.

Embodiment A3

The invention was described as being implemented by hardware in embodiment A1, but part or all of the structure shown in FIG. 1 may be implemented by software, that is, by a programmed computer. The image processing method in this case will be described with reference to FIGS. 15 to 18.

Figure 15:
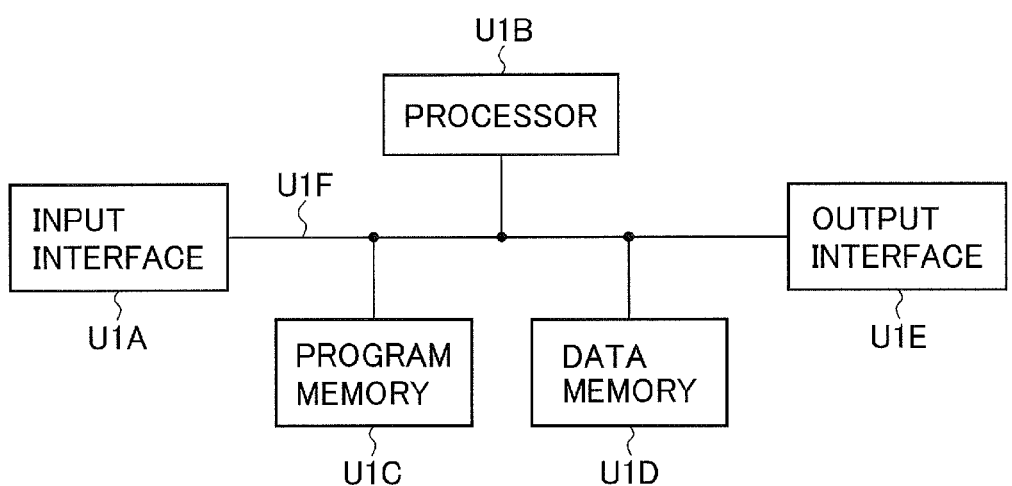
FIG. 15 is a block diagram showing the structure of a computing device used in the image processing method in embodiments A3, A4, B3, B4, C3, and C4 of the invention.

FIG. 15 shows a computing device used in the image processing method in embodiment A3, that is, a computing device (computer) that can be used as an image processing device in embodiment A3. The illustrated computing device includes an input interface U1A, a processor U1B, a program memory U1C, a data memory U1D, an output interface U1E, and a bus U1F that interconnects these components.

The processor U1B operates on an image input through the input interface U1A in accordance with a program stored in the program memory U1C. In the process of its operations, a variety of data are stored in the data memory U1D. The image created as a result of the process is output through the output interface U1E.

The computing device shown in FIG. 15 may be incorporated into the input image processor U1 in the image display device shown in FIG. 10 and used as a part of a novel image display device. If, for example, the number of pixels in the input image DIN is less than the number of pixels output by the display unit U2, the input image DIN is input through the input interface U1A to the computing device shown in FIG. 15. A program for executing the image processing method in this embodiment is stored in the program memory U1C, the processor U1B executes the stored program to process the input image DIN by the image processing method in this embodiment, and the result of the processing is output through the output interface U1E as the output image DOUT. These operations makes it possible to display a visually pleasing image even if the number of pixels in the input image DIN is less than the number of pixels output by the display unit U2.

Figure 16:
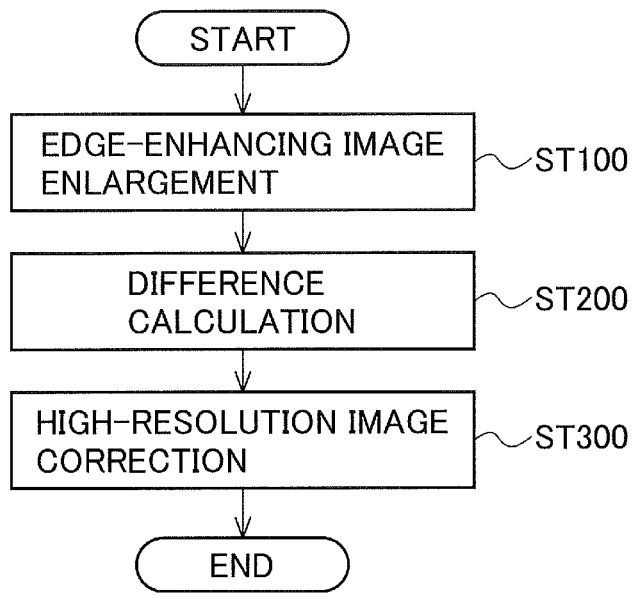
FIG. 16 is a flowchart illustrating a processing procedure used in the image processing method in embodiments A3, A4, B3, B4, C3, and C4 of the invention.

FIG. 16 illustrates the flow of an image processing method according to embodiment A3 that can be implemented by using the image processing device in FIG. 15.

The image processing method in embodiment A3 includes an edge-enhancing image enlargement step ST100, a difference calculation step ST200, and a high-resolution image correction step ST300.

In the edge-enhancing image enlargement step ST100, an edge-enhanced enlarged image D100 is generated by enlarging an input image D0 input in an image input step (not shown) and enhancing edges. Any known method may be used to generate an enlarged image in which edges in the input image D0 are enhanced. For example, the image processing method disclosed in U.S. Patent Application Publication No. 2010/0134518 may be used.

In the difference calculation step ST200, difference data D200 expressing differences between the input image D0 and the edge-enhanced enlarged image D100 are output. Pixels D0(x, y) in the input image D0 are successively selected as pixels of interest; a corresponding point in the edge-enhanced enlarged image D100 is specified for the pixel of interest; and difference data D200(x, y) indicating the difference in pixel value between the pixel of interest and the corresponding point are output.

Figure 17:
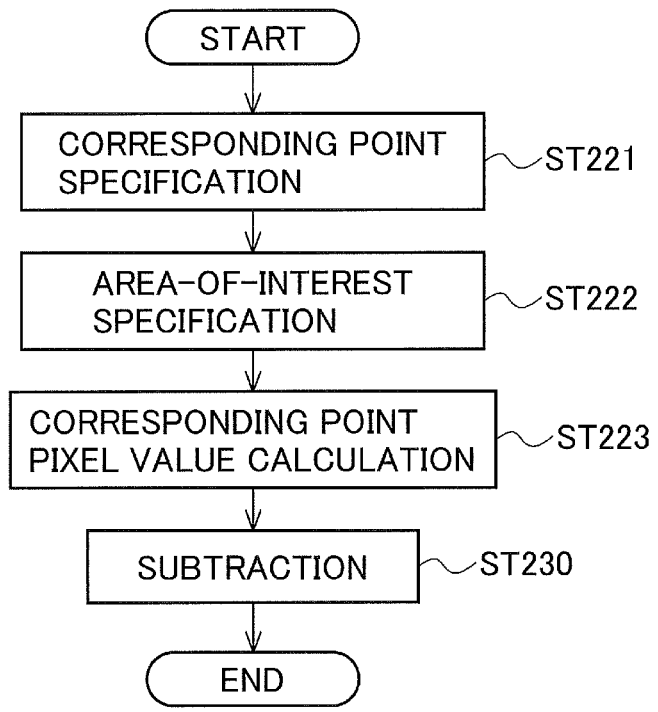
FIG. 17 is a flowchart illustrating the processing procedure in the difference calculation step ST200 in FIG. 16.

FIG. 17 illustrates the flow of processing in the difference calculation step ST200, which includes a corresponding-point specification step ST221, an area-of-interest specification step ST222, and a corresponding-point pixel value calculation step ST223.

The processing performed in the corresponding-point specification step ST221 is the same as the processing performed in the corresponding-point specifier 221 in embodiment A1.

The processing performed in the area-of-interest specification step ST222 is the same as the processing performed in the area-of-interest specifier 222 in embodiment A1.

The processing performed in the corresponding-point pixel value calculation step ST223 is the same as the processing performed in the corresponding-point pixel value calculator 223 in embodiment A1.

In the high-resolution image correction step ST300, the edge-enhanced enlarged image D100 is corrected to cancel out the differences expressed by the difference data D200, at least partially, and the result is output as the output image D300.

Figure 18:
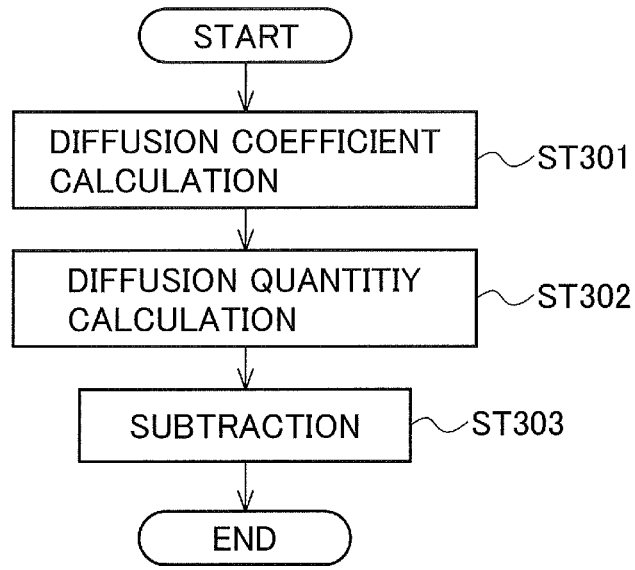
FIG. 18 is a flowchart illustrating the processing procedure used in embodiment A3 of the invention in the high-resolution image correction step ST300 in FIG. 16.

FIG. 18 illustrates the flow of processing in the high-resolution image correction step ST300, which includes a diffusion coefficient calculation step ST301, a diffusion quantity calculation step ST302, and a subtraction step ST303.

The processing performed in the diffusion coefficient calculation step ST301 is the same as the processing performed in the diffusion coefficient calculator 301 in embodiment A1.

The processing performed in the diffusion quantity calculation step ST302 is the same as the processing performed in the diffusion quantity calculator 302 in embodiment A1.

The processing performed in the subtraction step ST303 is the same as the processing performed in the subtractor 303 in embodiment A1.

The above is the processing in the image processing method in embodiment A3, which is equivalent in content to the image processing device in embodiment A1. The image processing method in embodiment A3 therefore has the same effect as the image processing device in embodiment A1.

In the edge-enhancing image enlargement step ST100 in FIG. 16, any known method of outputting an enlarged image in which edges in the input image D0 are enhanced may be used.

Figure 19:
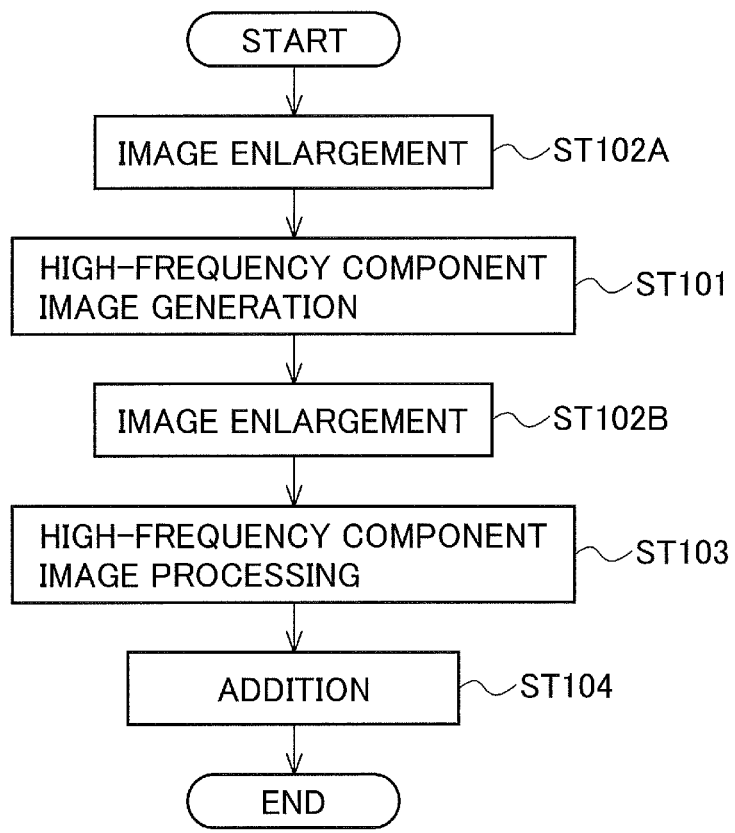
FIG. 19 is a flowchart illustrating the processing procedure in the edge-enhancing image enlargement step ST100 in FIG. 16.

FIG. 19 illustrates an example of the edge-enhancing image enlargement step ST100 as disclosed in U.S. Patent Application Publication No. 2010/0134518. The step includes an image enlargement step ST102A, a high-frequency component image generation step ST101, an image enlargement step ST102B, a high-frequency-component image processing step ST103, and an addition step S104. In the image enlargement step ST102A, an enlarged image D102A of the input image D0 is generated.

The image enlargement step ST102A performs the same processing as the image enlarger 102A in FIG. 11.

The high-frequency component image generation step ST101 performs the same processing as the high-frequency component image generator 101 in FIG. 11.

The image enlargement step ST102B performs the same processing as the image enlarger 102B in FIG. 11.

The high-frequency component image processing step ST103 performs the same processing as the high-frequency component image processor 103 in FIG. 11.

The addition step S104 performs the same processing as the adder 104 in FIG. 11.

As disclosed in U.S. Patent Application Publication No. 2010/0134518, the processing above can output an edge-enhanced enlarged image.

The edge-enhancing image enlargement step ST100 in FIG. 16 may differ from the processing described above. For example, the input image D0 may be simply enlarged and then passed through a known edge enhancement filter such as an unsharp mask, and the resultant image may be output. This process can also output an edge-enhanced enlarged image.

A variety of methods of outputting an edge-enhanced enlargement image other than the exemplary methods given above are known. Those methods may be used freely.

The alterations that can be made to the image processing device in embodiment A1 can also be applied to the image processing method in embodiment A3.

Embodiment A4

The invention was described as being implemented by hardware in embodiment A2, but the same processing as done by the image processing device in embodiment A2 can also be implemented by software. Like the image processing method in embodiment A3, the image processing method in embodiment A4 can be implemented by the image processing device in FIG. 15 and can also be used as part of an image display device.

Like the image processing method in embodiment A3, the image processing method in embodiment A4 can be implemented by the procedure shown in FIG. 16. The processing in the high-resolution image correction step ST300 differs, however, from the processing in the image processing method in embodiment A3.

Figure 20:
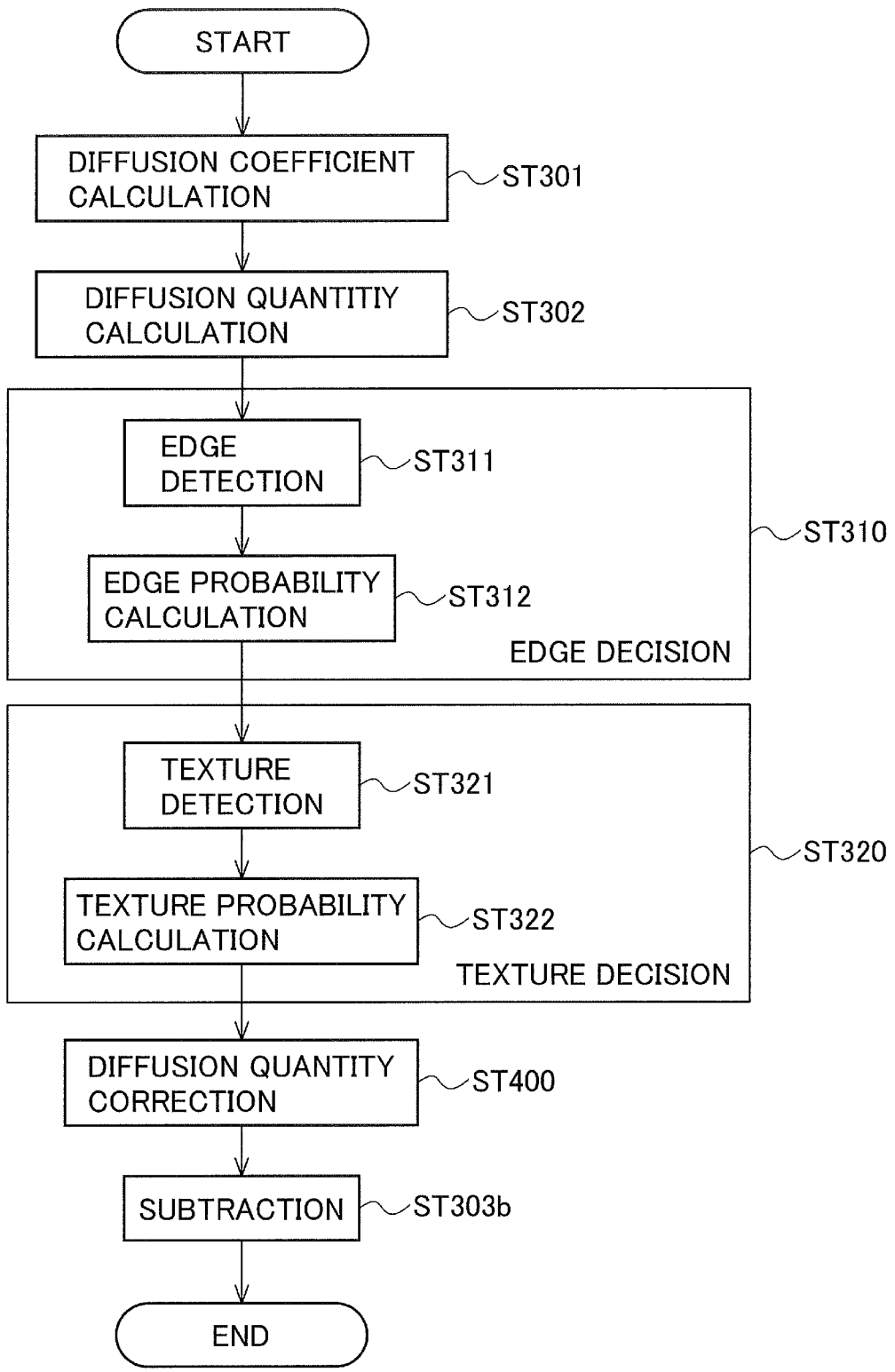
FIG. 20 is a flowchart illustrating the processing procedure used in embodiment A4 of the invention in the high-resolution image correction step ST300 in FIG. 16.

FIG. 20 illustrates the flow of processing in the high-resolution image correction step ST300 in embodiment A4. This high-resolution image correction step ST300 includes a diffusion coefficient calculation step ST301, a diffusion quantity calculation step ST302, an edge decision step ST310, a texture decision step ST320, a diffusion quantity correction step ST400, and a subtraction step ST303*b*.

The operations in the diffusion coefficient calculation step ST301 and diffusion quantity calculation step ST302 are the same as in embodiment A3.

In the edge decision step ST310, a value indicating the probability that each pixel in the edge-enhanced enlarged image D100 output in the edge-enhancing image enlargement step ST100 lies in an edge area is obtained, and the result is output as an edge determination result D310.

The edge decision step ST310 includes an edge detection step ST311 and an edge probability calculation step ST312.

Figure 21:
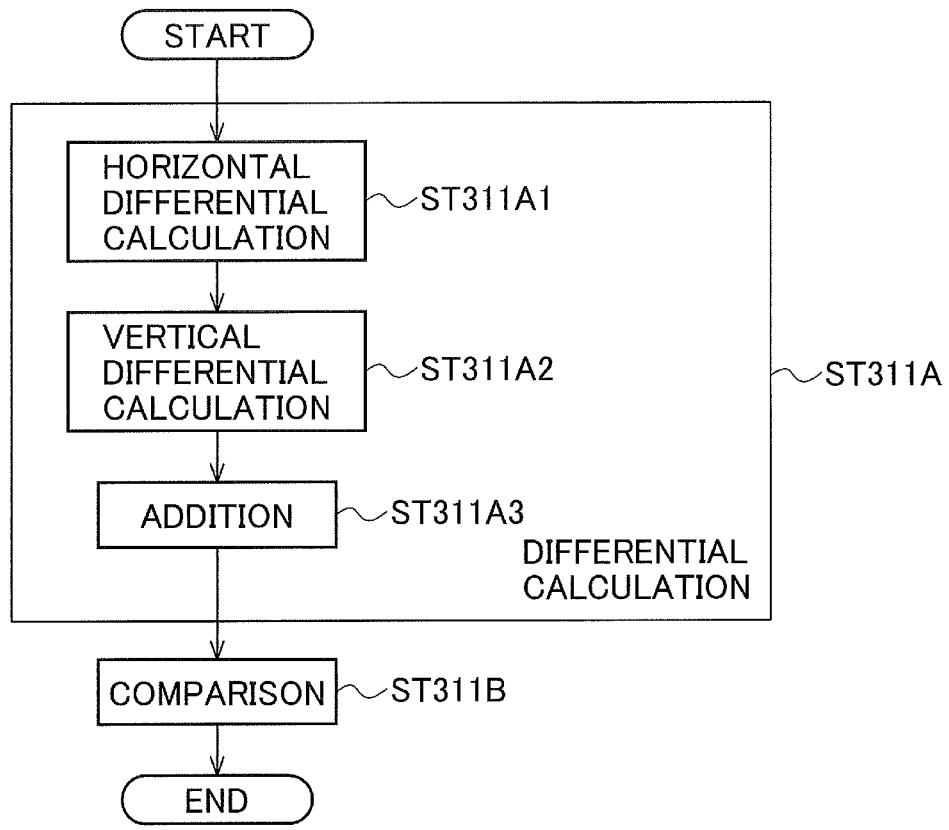
FIG. 21 is a flowchart illustrating the processing procedure in the edge detection step ST311 in FIG. 20.

FIG. 21 illustrates the flow of processing in the edge detection step ST311, which includes a differential calculation step ST311A and a comparison step ST311B.

The differential calculation step ST311A includes a horizontal differential calculation step ST311A1, a vertical differential calculation step ST311A2, and an addition step ST311A3.

The horizontal differential calculation step ST311A1 performs the same processing as the horizontal differential calculator 311A1 in embodiment A2.

The vertical differential calculation step ST311A2 performs the same processing as the vertical differential calculator 311A2 in embodiment A2.

The addition step ST311A3 performs the same processing as the adder 311A3 in embodiment A2.

The differential calculation step ST311A operates as described above and, in the content of its processing, is equivalent the differential calculator 311A in embodiment A2.

The comparison step ST311B performs the same processing as the differential calculator 311A in embodiment A2.

The edge detection step ST311 operates as described above and, in the content of its processing, is equivalent the edge detector 311 in embodiment A2.

The edge probability calculation step ST312 performs the same processing as the edge probability calculator 312.

The edge decision step ST310 operates as described above and, in the content of its processing, is equivalent the edge determiner 310 in embodiment A2.

In the texture decision step ST320, a value indicating the probability that each pixel in the edge-enhanced enlarged image D100 lies in a textured area is obtained, and the result is output as a texture determination result D320.

The texture decision step ST320 includes a texture detection step ST321 and a texture probability calculation step ST322.

Figure 22:
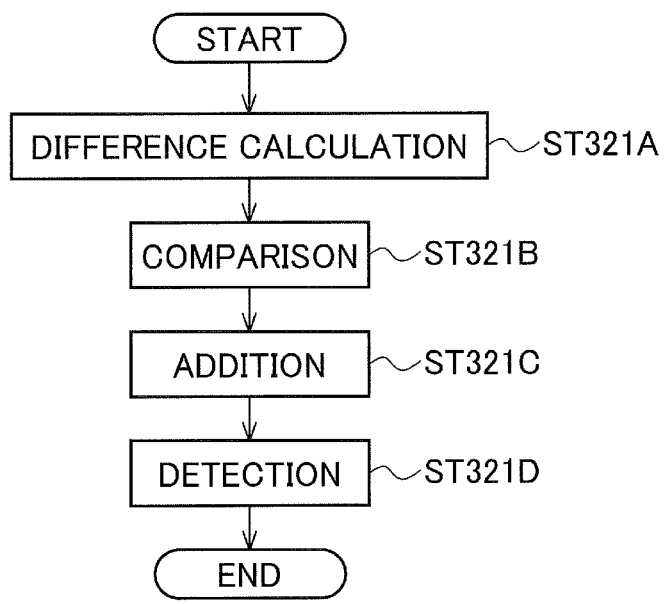
FIG. 22 is a flowchart illustrating the processing procedure in the texture detection step ST321 in FIG. 20.

FIG. 22 illustrates the flow of processing in the texture detection step ST321, which includes a difference calculation step ST321A, a comparison step ST321B, an addition step ST321C, and a detection step ST321D.

The operation in the difference calculation step ST321A is the same as the operation performed in the difference calculator 321A in embodiment A2.

The comparison step ST321B performs the same operation as the comparator 321B in embodiment A2.

The addition step ST321C performs the same operation as the adder 321C in embodiment A2.

The detection step ST321D performs the same operation as the detector 321D in embodiment A2.

The texture detection step ST321 operates as described above and, in the content of its processing, is equivalent the texture detector 321 in embodiment A2.

The texture probability calculation step ST322 performs the same operation as the texture probability calculator 322 in embodiment A2.

The texture decision step ST320 operates as described above and, in the content of its processing, is equivalent the texture determiner 320 in embodiment A2.

The diffusion quantity correction step ST400 performs the same processing as the diffusion quantity corrector 400 in embodiment A2.

The subtraction step ST303*b* performs the same processing as the subtractor 303*b* in embodiment A2.

The above is the processing in the image processing method in embodiment A4, which is equivalent in content to the image processing device in embodiment A2. The image processing method in embodiment A4 therefore has the same effect as the image processing device in embodiment A2.

The alterations that can be made to the image processing device in embodiment A2 can also be applied to the image processing method in embodiment A4.

Embodiment B1

Like the image processing device in embodiment A1, the image processing device in embodiment B1 can be implemented by the structure shown in FIG. 1. The structure and operation of the high-resolution image corrector 300 are different, however, from those of the image processing device in embodiment A1.

Figure 23:
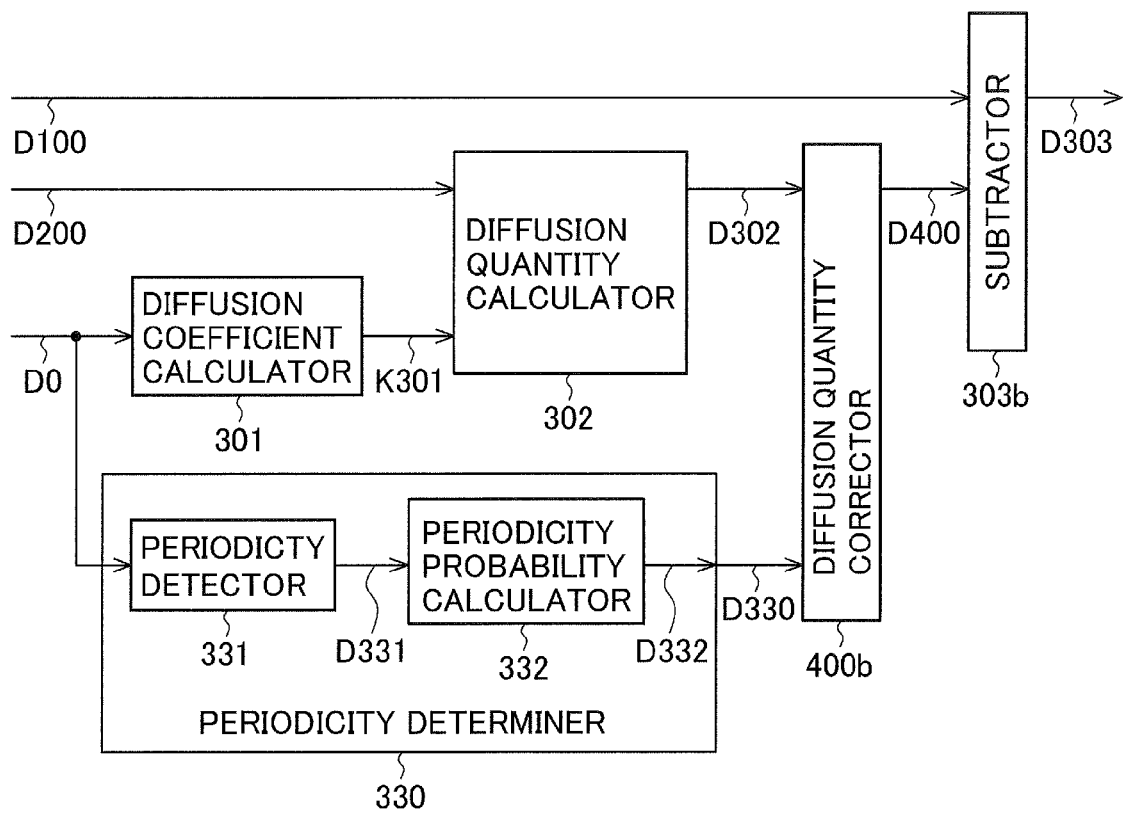
FIG. 23 is a block diagram showing an example of the structure of the high-resolution image corrector 300 in FIG. 1, as used in embodiment B1 of the invention.

FIG. 23 shows an example of the structure of the high-resolution image corrector 300 in embodiment B1.

The high-resolution image corrector 300 in FIG. 23 includes a diffusion coefficient calculator 301, a diffusion quantity calculator 302, a periodicity determiner 330, a diffusion quantity corrector 400*b*, and a subtractor 303*b*.

As the diffusion coefficient calculator 301 and diffusion quantity calculator 302, the corresponding components in embodiment A1 or A2, described with reference to FIG. 5, may be used. As the subtractor 303*b*, the corresponding component in embodiment A2, described with reference to FIG. 12, may be used.

The periodicity determiner 330 detects parts of the edge-enhanced enlarged image D100 that include periodic patterns. The periodic patterns referred to here are patterns in which regular variations in pixel value appear, as in a vertically striped pattern or a horizontally striped pattern.

The periodicity determiner 330 shown in FIG. 23 includes a periodicity detector 331 and a periodicity probability calculator 332.

Figure 24:
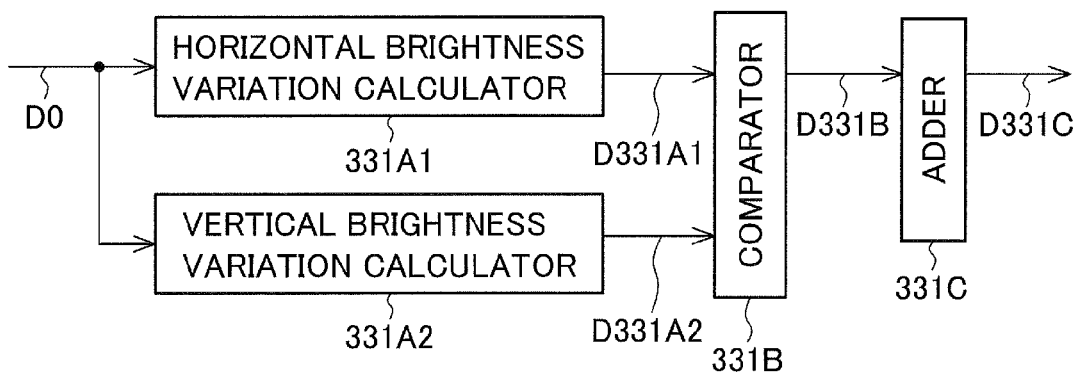
FIG. 24 is a block diagram showing an example of the structure of the periodicity detector 331 in FIG. 23.

FIG. 24 shows an example of the structure of the periodicity detector 331 in FIG. 23. The illustrated periodicity detector 331 includes a horizontal brightness variation calculator 331A1, a vertical brightness variation calculator 331A2, a comparator 331B, and an adder 331C.

The horizontal brightness variation calculator 331A1 calculates, for each pixel P0 in the input image D0, a horizontal differential value D331A1 indicating a brightness change of pixel value in the horizontal direction. If the horizontal brightness variation value D331A1 calculated for pixel P0(x, y) is denoted D331A1(x, y), this is expressed as follows.

$$D331A1(x,y)=|P0(x,y)-P0(x-1,y)|+|P0(x,y)-P0(x+1,y)| \quad (36)$$

The horizontal brightness variation value D331A1 calculated for each pixel represents the sum of the absolute values of the difference in brightness value between the pixel and the horizontally adjacent pixel on one side and the difference in brightness value between the pixel and the horizontally adjacent pixel on the other side.

The vertical brightness variation calculator 331A2 calculates, for each pixel P0 in the input image D0, a vertical brightness variation value D331A2 indicating a brightness change of pixel value in the vertical direction. If the vertical brightness variation value D331A2 calculated for pixel P0(x, y) is denoted D331A2(x, y), this is expressed as follows.

$$D331A2(x,y)=|P0(x,y)-P0(x,y-1)|+|P0(x,y)-P0(x,y+1)| \quad (37)$$

The vertical brightness variation value D331A2 calculated for each pixel represents the sum of the absolute values of the difference in brightness value between the pixel and the vertically adjacent pixel on one side and the difference in brightness value between the pixel and the vertically adjacent pixel on the other side.

The comparator 331B compares the horizontal differential value D331A1 and the vertical brightness variation value D331A2 and outputs a brightness variation comparison result D331B indicating whether the difference between the two values is equal to or greater than a threshold Th331B. If the brightness variation comparison result D331B obtained for pixel P0(x, y) is denoted D331B(x, y), this is expressed as follows.

$$D331B(x, y) = \begin{cases} 1 & \text{if}(|D331A1(x, y) - D331A2(x, y)| \geq Th331B) \\ 0 & \text{else} \end{cases} \quad (38)$$

The adder 331C outputs the result of addition or summation of the brightness variation comparison results D331B of pixels in the vicinity of each pixel of interest as a comparison result sum D331C. If the comparison result sum D331C obtained for pixel P0(x, y) is denoted D331C(x, y), this is expressed as follows.

$$D331C(x, y) = \sum_{i,j} D331B(x + i, y + j) \quad (39)$$

The periodicity detector 331 outputs the comparison result sum D331C as a periodicity detection result D331. As the result of the processing above, the number D331C of pixels where the decision result D331B indicating that the difference between the horizontal differential value D331A1 and the vertical brightness variation value D331A2 exceeds the threshold Th331B is obtained as the periodicity detection result D331.

Pixels included in an area where there is a vertically periodic pattern (such as a horizontally striped pattern) have small horizontal brightness variation values D331A1 (equation (36)) and large vertical brightness variation values D331A2 (equation (37)). Pixels included in an area where there is a horizontally periodic pattern (such as a vertically striped pattern) have large horizontal brightness variation values D331A1 (equation (36)) and small vertical brightness variation values D331A2 (equation (37)).

If the difference between the horizontal and vertical brightness variation values D331A1, D331A2 has a certain magnitude, it is highly probable that the pixel lies in an area having a periodic pattern. The value shown in equation (38) is usually '1' if pixel P0(x, y) lies in an area having a periodic pattern, and usually '0' if pixel P0(x, y) does not lie in an area having a periodic pattern.

The above description applies to most of the pixels in an area having a periodic pattern. Therefore, the D331C (equation (39)) obtained by summing the brightness variation comparison results D331B in a local area including pixels P0(x, y) with a periodic pattern has a high value. The D331C (equation (39)) in an area lacking a periodic pattern has a low value.

Accordingly, as the value of the periodicity detection result D331 (=D331C) of pixel P0 increases, the probability that pixel P0 lies in an area with a periodic pattern increases.

The periodicity probability calculator 332 determines a periodicity probability D332 indicating the probability that pixels P100 in the edge-enhanced enlarged image D100 are included in an area having a periodic pattern (referred to below as a periodic area).

An exemplary way to determine the periodicity probability D332 will now be described.

The input image D0 and the edge-enhanced enlarged image D100 are images of the same subject. An area having a periodic pattern in the input image D0 is accordingly also an area having a periodic pattern in the edge-enhanced enlarged image D100. Therefore, if a pixel P0 in the input image D0 lies in an area having a periodic pattern and lies in the vicinity, when the input image D0 is superimposed on the edge-enhanced enlarged image D100, of a pixel P100 in the edge-enhanced enlarged image D100, it is highly probable that pixel P100 also lies in an area having a periodic pattern (a periodic area). Conversely, if a pixel P100 lies in a periodic area, pixels P0 in its vicinity usually lie in a periodic area, and the values of their periodicity detection results D331 are usually high. This leads to the observation that if a pixel P100 lies in a periodic area, the value obtained by summing the periodicity detection results D331 calculated for pixels P0 in its vicinity is likely to be high. That is, as the value obtained by summing the periodicity detection results D331 calculated for pixels P0 in the vicinity of pixel P100 increases, it becomes increasingly probable that pixel P100 lies in a periodic area.

From the argument above, it follows that when the input image D0 is superimposed on the edge-enhanced enlarged image D100, the periodicity probability D332 can be obtained by adding the periodicity detection results D331 calculated for pixels P0 in the input image D0 in the vicinity of pixel P100 (the pixel to be corrected) in the edge-enhanced enlarged image D100.

Pixels P0 in the vicinity of pixel P100(x, y) are expressed as follows by using integers i and j.

$$P0([x]+i, [y]+j)$$

The periodicity detection results D331 calculated for these pixels P0 are expressed as follows.

$$D331([x]+i, [y]+j)$$

If the periodicity probability D332 obtained for pixel P100(x, y) is denoted D332(x, y), this is expressed as follows.

$$D332(x, y) = \sum_{i=-H0}^{H1} \sum_{j=-V0}^{V1} D331([x] + i, [y] + j) \quad (40)$$

The equation above indicates that the periodicity probability D332(x, y) is obtained by adding the periodicity detection results D331 obtained in a zone around pixel P0([x], [y]) extending H0 pixels to the left and H1 pixels to the right in the horizontal direction, and V0 pixels above and V1 pixels below in the vertical direction. As indicated by the argument above, the larger the value of the periodicity probability D332 is, the greater the possibility that pixel P100 lies in a periodic area becomes.

The periodicity determiner 330 outputs the periodicity probability D332 as a periodicity determination result D330. As a result of the above processing, the periodicity detection results D331 obtained for each pixel are summed across an entire area neighboring each pixel of interest to obtain a periodicity probability D332, which is output as the periodicity determination result D330.

The diffusion quantity corrector 400b is similar to the diffusion quantity corrector 400 in embodiment A2 but differs in that it obtains the corrected diffusion quantity D400 from the difference diffusion quantity D302 and the periodicity determination result D330.

For each pixel P100 in the edge-enhanced enlarged image D100, the diffusion quantity corrector 400b determines a correction coefficient F330. The correction coefficient F330 calculated for pixel P100(x, y) will be denoted F330(x, y). The correction coefficient F330(x, y) is obtained in accordance with the value of the periodicity determination result D330(x, y). For example, the correction coefficient F330(x, y) is obtained so that it decreases monotonically with respect to the value of the periodicity determination result D330(x, y).

The diffusion quantity corrector 400b determines a corrected diffusion quantity D400 for each pixel P100 in the edge-enhanced enlarged image D100 by correcting the difference diffusion quantity D302 in accordance with the value of the correction coefficient F330. The correction is made by, for example, multiplying the difference diffusion quantity D302 by the correction coefficient F330. If the corrected diffusion quantity D400 calculated for pixel P100(x, y) is denoted D400(x, y), this is expressed as follows.

$$D400(x,y)=F330(x,y)\times D302(x,y) \quad (41)$$

The subtractor 303b outputs a difference-corrected image D303 in which the pixel values are obtained by subtracting the corrected diffusion quantity D400(x, y) calculated for each pixel P100(x, y) from the pixel value D100(x, y) of pixel P100(x, y) in the edge-enhanced enlarged image D100. If the pixel at coordinates (x, y) in the difference-corrected image D303 is denoted P303(x, y), and the pixel value of pixel P303(x, y) is denoted D303(x, y), this is expressed as follows.

$$D303(x,y)=D100(x,y)-D400(x,y)$$

The high-resolution image corrector 300 outputs the difference-corrected image D303 as the output image D300.

The effects of the image processing device in this embodiment are as follows.

The perceived resolution in textured areas can be improved by subtraction of the difference diffusion quantity D302 from the edge-enhanced enlarged image D100, as described in embodiment A1. If the input image D0 or edge-enhanced enlarged image D100 includes a periodic pattern, however, the picture quality may be lowered.

For example, if a pattern differing from the original periodic pattern included in the area appears in part of the area as a result of correction of the edge-enhanced enlarged image D100 to at least partially cancel out the difference data D200, brightness variations may look unnatural and the picture quality may be lowered.

In the image processing device in this embodiment, the periodicity determiner 330 obtains a periodicity determination result D330 indicating the probability that the edge-enhanced enlarged image D100 includes a periodic pattern, and the value of the difference diffusion quantity D302 is corrected as in equation (41) so that the corrected diffusion quantity D400 takes small values (or the size of the corrected diffusion quantity D400 is reduced) in areas in the edge-enhanced enlarged image D100 in which the inclusion of a periodic pattern is a strong possibility.

As in embodiment A1, the image processing device in embodiment B1 creates pixels having a variety of pixel values in textured areas. Accordingly, the perceived resolution in textured areas is improved, and moreover, the picture quality of the output image D300 is not lowered even if the input image D0 includes a periodic pattern.

Like the image processing device in embodiment A1, the image processing device in embodiment B1 can also be used as part of an image display device. For example, the image processing device in embodiment B1 may be included, instead of the image processing device in embodiment A1, in the input image processor U1 of the image display device shown in FIG. 10.

One can conceive of various alterations that can be made to the image processing device in this embodiment without departing from its gist. To begin with, the same alterations as described in embodiments A1 and A2 may be made.

The accuracy with which positions having a periodic pattern are detected can be improved by carrying out an isolated-point removal process on the periodicity detection results D331 output from the periodicity detector 331 in FIG. 23 or the brightness variation comparison results D331B output from the comparator 331B in FIG. 24. A median filter, for example, or a morphological operation combining contraction and expansion processes may be used in the isolated-point removal process.

Effects similar to those described above can also be obtained by carrying out the isolated-point removal process on the periodicity probability D332 instead of the periodicity detection result D331.

The method of detecting the positions of periodic patterns is not limited to the example described above; differential pixel values other than the differential quantities given in equation (36) and (37) may be used. For example, the absolute value of a second-order horizontal differential pixel value may be calculated as the horizontal brightness variation value D331A1, and the absolute value of a second-order vertical differential pixel value may be calculated as the vertical brightness variation value D331A2. The directions of calculation of the differential pixel values are not limited to the horizontal and vertical directions; the calculations need only be made in at least two different directions. If the difference between the minimum and maximum values of the differences (or the absolute values of differences) calculated in at least two different directions exceeds a given threshold, it can be decided that a periodic pattern is present. Any other known method that can detect areas having periodic patterns may also be used. For example, a Gabor filter may be used to decide whether a periodic pattern is present. Alternatively, the input image D0 or edge-enhanced enlarged image D100 may be subdivided into areas and a frequency analysis of each area may be carried out by a Fourier transform; if the result includes a strong signal with a particular frequency, it may be concluded that a periodic pattern is present.

The correction of the difference diffusion quantity D302 in accordance with the correction coefficient F330 is not limited to the examples described above. It is only necessary for the correction to correct the difference diffusion quantity D302 to a small value in areas having periodic patterns.

The correction coefficient F330 need not decrease monotonically with respect to the periodicity determination result D330; it need only have a value less than 1 (or a value that can correct the difference diffusion quantity D302 by reducing it) in at least some sections where, for example, the periodicity determination result D330 exceeds a given threshold.

The calculation for correcting the difference diffusion quantity D302 is not limited to multiplication by correction coefficient F330. For example, the corrected diffusion quantity D400 may be obtained by subtracting, from the difference diffusion quantity D302, a correction value that increases as the value of the periodicity determination result D330 increases. Alternatively, a process that reduces the corrected diffusion quantity D400 to a level smaller than the difference diffusion quantity D302 in at least some sections where the periodicity determination result D330 exceeds a given threshold may be carried out.

Any correction of the difference diffusion quantity D302 in accordance with the periodicity determination result D330 that can restrain (or reduce) the magnitude of the corrected diffusion quantity D400 in areas having a periodic pattern may be made.

The process of varying the value of the corrected diffusion quantity D400 based on correction coefficient F330 could also be described as a process of having the periodicity detector 331 detect positions including periodic patterns in the edge-enhanced enlarged image D100 and restraining the corrected diffusion quantity D400 so that it does not become large in areas close, when the input image D0 is superimposed on the edge-enhanced enlarged image D100, to the positions determined by the periodicity detector 331 to include periodic patterns.

The process of varying the value of the corrected diffusion quantity D400 based on correction coefficient F330 could in addition be described as a process of having the periodicity determiner 330 detect positions including periodic patterns in the difference data D200 and restraining the corrected diffusion quantity D400 so that it does not become large in positions determined to include periodic patterns.

Embodiment B2

Like the image processing device in embodiment A1, the image processing device in embodiment B2 can be implemented by the structure shown in FIG. 1. The structure and operation of the high-resolution image corrector 300 are different, however, from those of the image processing device in embodiment A1. Like the image processing device in embodiment A1, the image processing device in embodiment B2 can be used as a part of an image display device.

Figure 25:
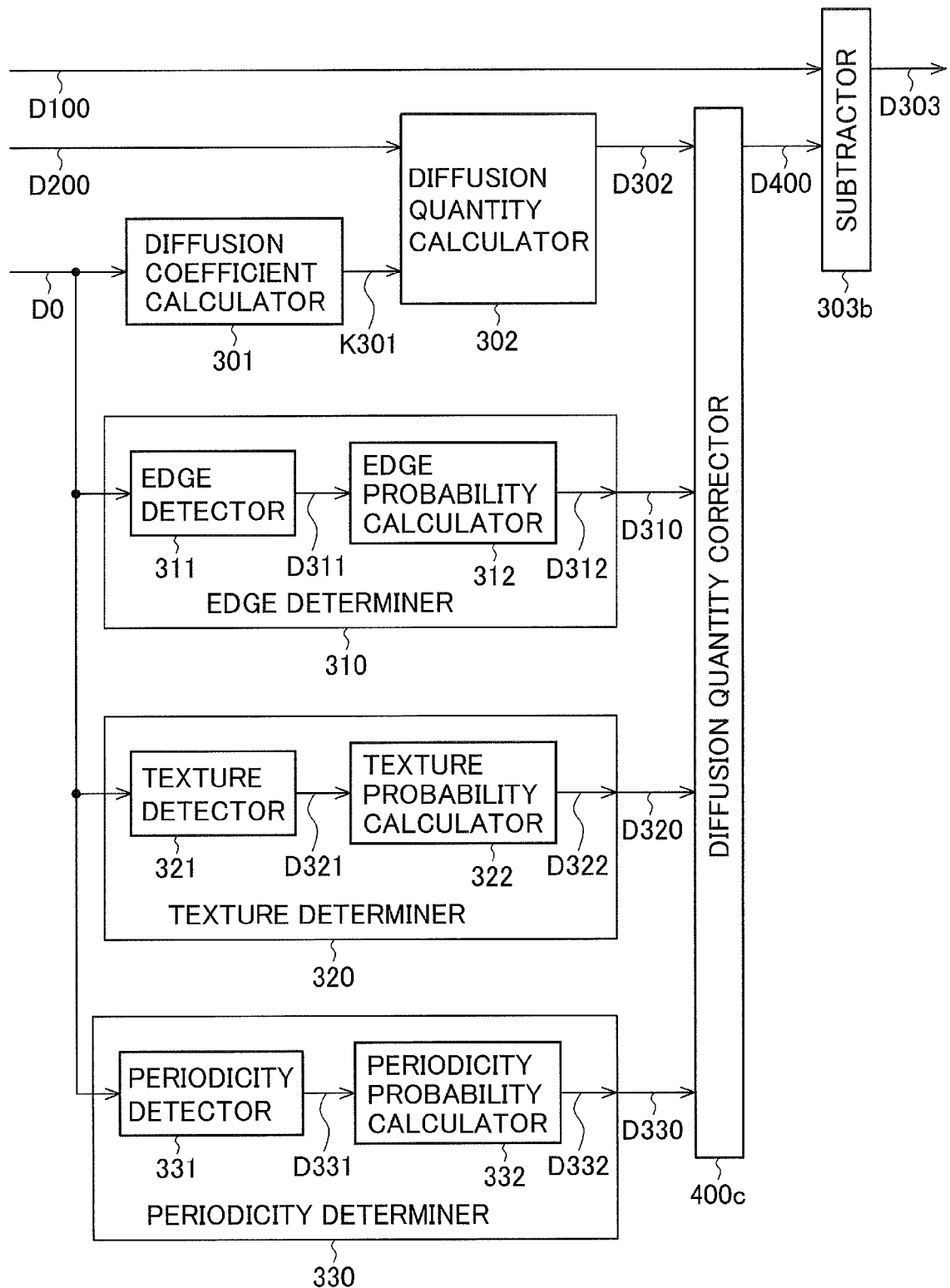
FIG. 25 is a block diagram showing an example of the structure of the high-resolution image corrector 300 in FIG. 1, as used in embodiment B2 of the invention.

FIG. 25 shows an example of the structure of the high-resolution image corrector 300 in embodiment B2.

The high-resolution image corrector 300 in FIG. 25 includes a diffusion coefficient calculator 301, a diffusion quantity calculator 302, an edge determiner 310, a texture determiner 320, a periodicity determiner 330, a diffusion quantity corrector 400c, and a subtractor 303b.

As the diffusion coefficient calculator 301 and diffusion quantity calculator 302, the corresponding components described in embodiment A1, A2, or B1 may be used. As the subtractor 303b, the corresponding component described in embodiment A1 or B1 may be used.

As the periodicity determiner 330, the corresponding component described in embodiment B1 may be used.

As the edge determiner 310 and texture determiner 320, the corresponding components described in embodiment A2 may be used.

The diffusion quantity corrector 400c is similar to the diffusion quantity corrector 400b in embodiment B1 but differs in that the corrected diffusion quantity D400 is obtained from an edge determination result D310 and a texture determination result D320 as well as from the difference diffusion quantity D302 and periodicity determination result D330. The diffusion quantity corrector 400c corrects the value of the difference diffusion quantity D302 in accordance with a correction coefficient F310 varying with the edge determination result D310, a correction coefficient F320 varying with the texture determination result D320, and a correction coefficient F330 varying with the periodicity determination result D330 described in embodiment B1.

Correction coefficients F310 and F320 can be obtained as in embodiment A2. Correction coefficient F330 can be obtained as in embodiment B1.

The diffusion quantity corrector 400c determines a corrected diffusion quantity D400 for each pixel P100 in the edge-enhanced enlarged image D100 by correcting the difference diffusion quantity D302 in accordance with the values of the correction coefficients F310, F320, F330. The correction is made, for example, by multiplying the difference diffusion quantity D302 by the correction coefficients F310, F320, F330. If the corrected diffusion quantity D400 calculated for pixel P100(x, y) is denoted D400(x, y), this is expressed as follows.

$$D400(x,y)=F310(x,y) \times F320(x,y) \times F330(x,y) \times D302(x,y)$$

The subtractor 303b outputs a difference-corrected image D303 in which the pixel values are obtained by subtracting the corrected diffusion quantity D400(x, y) calculated for each pixel P100(x, y) from the pixel value D100(x, y) of pixel P100(x, y) in the edge-enhanced enlarged image D100. The pixel value D303(x, y) in the difference-corrected image D303 is expressed as follows.

$$D303(x,y)=D100(x,y)-D400(x,y)$$

The high-resolution image corrector 300 outputs the difference-corrected image D303 as the output image D300.

The diffusion quantity corrector 400c in this embodiment differs from embodiment B1 in that the degree of correction of the difference diffusion quantity D302 varies based on correction coefficients F310 and F320 as well as correction coefficient F330.

When it is highly probable that pixel P100 lies in an edge area, the diffusion of difference data D200 can be restrained by varying the corrected diffusion quantity D400 according to correction coefficient F310. The perceived resolution in the textured areas can thereby be improved while preserving as much of the effect of edge enhancement in the edge-enhancing image enlarger 100 as possible.

In addition, when it is highly probable that pixel P100 lies in a textured area, diffusion of the difference data D200 is performed (not inhibited) by varying the corrected diffusion quantity D400 in accordance with correction coefficient F320. The diffusion of difference data D200 in areas, typically edge areas, that lie outside textured areas can thereby also be restrained, so that the perceived resolution in textured areas can be improved while preserving the effect of edge enhancement in the edge-enhancing image enlarger 100.

Therefore, the image processing device in this embodiment can improve the perceived resolution in textured areas while preserving the effect of edge enhancement by the edge-enhancing image enlarger 100.

The perceived resolution in textured areas can be improved while preserving the effect of edge enhancement in the edge-enhancing image enlarger 100 by using at least one of correction coefficients F310 and F320.

One can conceive of various alterations that can be made to the image processing device in this embodiment without departing from its gist. In particular, the same alterations as described in embodiments A1, A2, and B1 can be made.

Embodiment B3

The invention is implemented by hardware in embodiment B1, but processing identical to the image processing in embodiment B1 can also be implemented by software. Like the image processing method in embodiment A3, the image processing method in embodiment B3 can be implemented by the image processing device in FIG. 15 and can also be used as part of an image display device.

Like the image processing method in embodiment A3, the image processing method in embodiment B3 can be implemented by the procedure shown in FIG. 16. The processing in the high-resolution image correction step ST300 differs, however, from the processing in the image processing method in embodiment A3.

Figure 26:
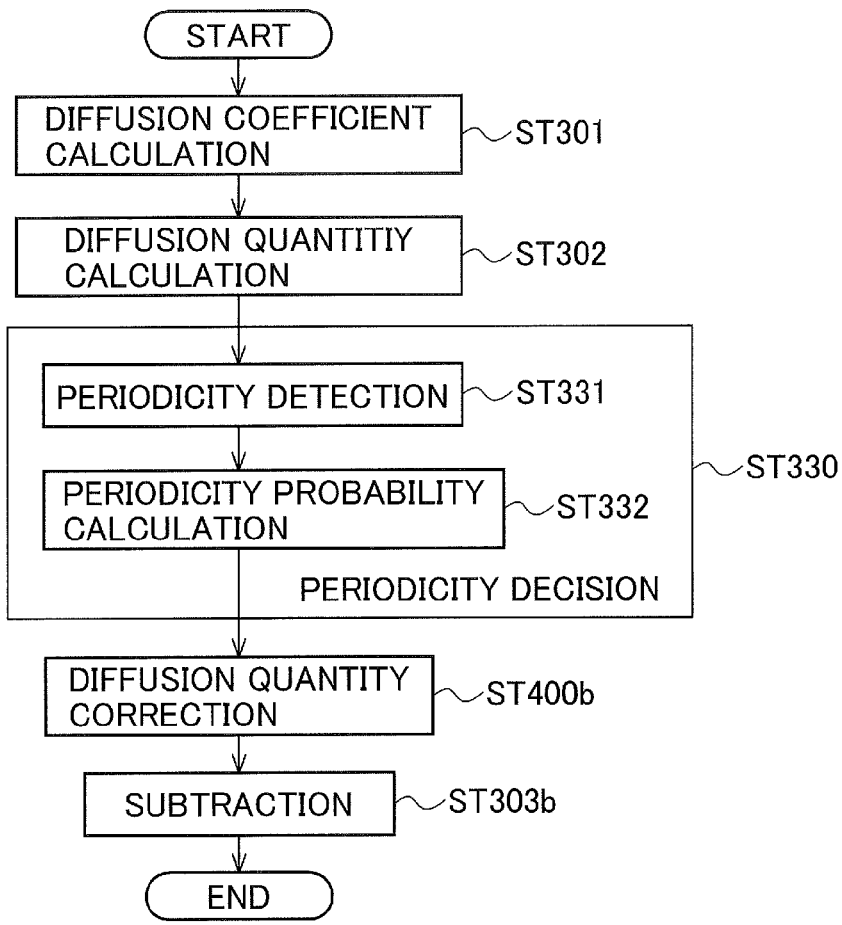
FIG. 26 is a flowchart illustrating the processing procedure used in embodiment B3 of the invention in the high-resolution image correction step ST300 in FIG. 16.

FIG. 26 illustrates the flow of processing in the high-resolution image correction step ST300 in embodiment B3. This high-resolution image correction step ST300 includes a diffusion coefficient calculation step ST301, a diffusion quantity calculation step ST302, a periodicity decision step ST330, a diffusion quantity correction step ST400b, and a subtraction step ST303b.

The operations in the diffusion coefficient calculation step ST301 and diffusion quantity calculation step ST302 are the same as in embodiment A3.

The periodicity decision step ST330 includes a periodicity detection step ST331 and a periodicity probability calculation step ST332.

Figure 27:
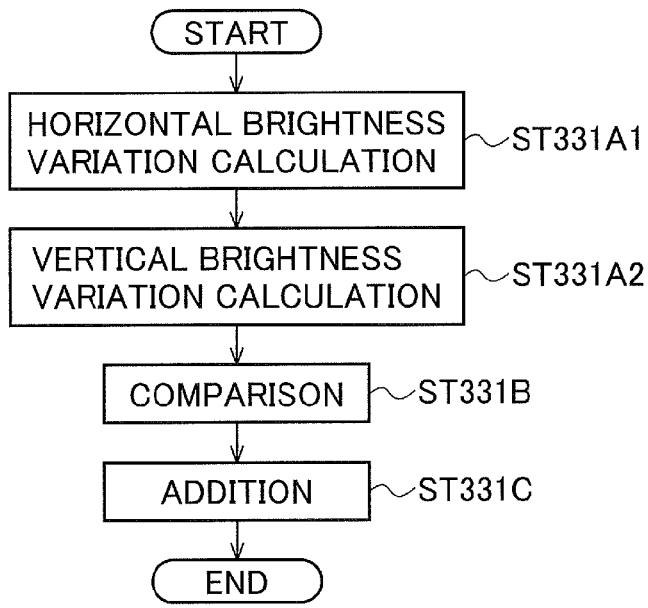
FIG. 27 is a flowchart illustrating the processing procedure in the periodicity detection step ST331 in FIG. 26.

FIG. 27 illustrates the processing procedure in the periodicity detection step ST331 in FIG. 26. The periodicity detection step ST331 includes a horizontal brightness variation calculation step ST331A1, a vertical brightness variation calculation step ST331A2, a comparison step ST331B, and an addition step ST331C.

The horizontal brightness variation calculation step ST331A1 performs the same processing as the horizontal brightness variation calculator 331A1 in embodiment B1.

The vertical brightness variation calculation step ST331A2 performs the same processing as the vertical brightness variation calculator 331A2 in embodiment B1.

The comparison step ST331B performs the same processing as the comparator 331B in embodiment B1.

The addition step ST331C performs the same processing as the adder 331C in embodiment B1.

The periodicity detection step ST331 operates as described above and, in the content of its processing, is equivalent to the periodicity detector 331 in embodiment B1.

The processing performed in the periodicity probability calculation step ST332 in FIG. 26 is the same as the processing performed in the periodicity probability calculator 332 in embodiment B1.

The periodicity decision step ST330 operates as described above and, in the content of its processing, is equivalent to the periodicity determiner 330 in embodiment B1.

The processing performed in the diffusion quantity correction step ST400b is equivalent to the processing performed in the diffusion quantity corrector 400b in embodiment B1.

The processing performed in the subtraction step ST303b is the same as the processing performed in the subtractor 303b in embodiment B1.

The above is the processing in the image processing method in embodiment B3, which is equivalent in content to the image processing device in embodiment B1. The image processing method in embodiment B3 therefore has the same effect as the image processing device in embodiment B1.

The alterations that can be made to the image processing device in embodiment B1 can also be applied to the image processing method in embodiment B3.

Embodiment B4

The invention was described as being implemented by hardware in embodiment B2, but the same processing as done by the image processing device in embodiment B2 can also be implemented by software. Like the image processing method in embodiment B3, the image processing method in embodiment B4 can be implemented by the image processing device in FIG. 15 and can also be used as part of an image display device.

Like the image processing method in embodiment B3, the image processing method in embodiment B4 can be implemented by the procedure in FIG. 16. The processing in the high-resolution image correction step ST300 differs, however, from the processing in the image processing method in embodiment B3.

Figure 28:
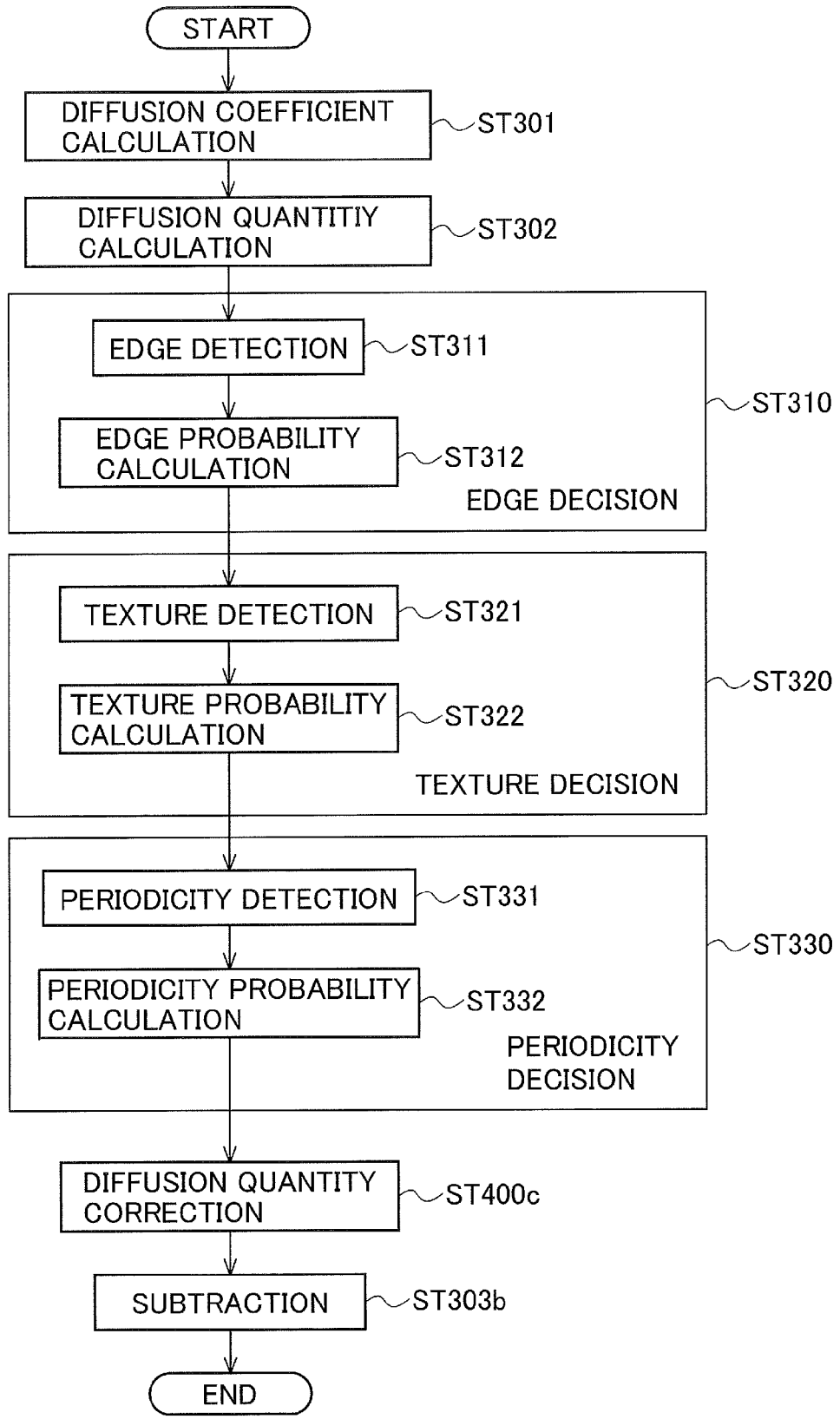
FIG. 28 is a flowchart illustrating the processing procedure used in embodiment B4 of the invention in the high-resolution image correction step ST300 in FIG. 16.

FIG. 28 illustrates the flow of processing in the high-resolution image correction step ST300 in embodiment B4. This high-resolution image correction step ST300 includes a diffusion coefficient calculation step ST301, a diffusion quantity calculation step ST302, an edge decision step ST310, a texture decision step ST320, a periodicity decision step ST330, a diffusion quantity correction step ST400c, and a subtraction step ST303b.

The operations in the diffusion coefficient calculation step ST301, diffusion quantity calculation step ST302, and periodicity decision step ST330 are the same as in embodiment B3.

The operations in the edge decision step ST310 and texture decision step ST320 are the same as in embodiment A4.

The diffusion quantity correction step ST400c performs the same processing as the diffusion quantity corrector 400c in embodiment B2.

The subtraction step ST303b performs the same processing as the subtractor 303b in embodiment B2.

The above is the processing in the image processing method in embodiment B4, which is equivalent in content to the image processing device in embodiment B2. The image processing method in embodiment B4 therefore has the same effect as the image processing device in embodiment B2.

The alterations that can be made to the image processing device in embodiment B2 can also be applied to the image processing method in embodiment B4.

Embodiment C1

Like the image processing device in embodiment A1, the image processing device in embodiment C1 can be implemented by the structure shown in FIG. 1. The structure and operation of the high-resolution image corrector 300 are different, however, from those of the image processing device in embodiment A1.

Figure 29:
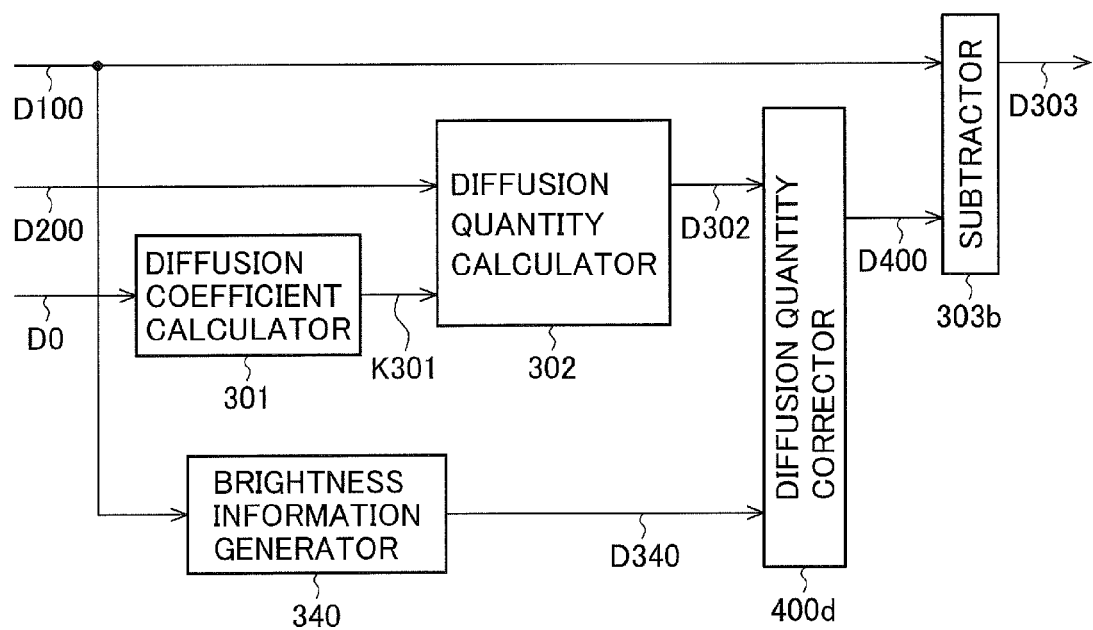
FIG. 29 is a block diagram showing an example of the structure of the high-resolution image corrector 300 in FIG. 1, as used in embodiment C1 of the invention.

FIG. 29 shows an example of the structure of the high-resolution image corrector 300 in embodiment C1.

The high-resolution image corrector 300 in FIG. 29 includes a diffusion coefficient calculator 301, a diffusion quantity calculator 302, a brightness information generator 340, a diffusion quantity corrector 400d, and a subtractor 303b.

As the diffusion coefficient calculator 301 and diffusion quantity calculator 302, the corresponding components described in embodiment A1, A2, B1, or B2 may be used. As the subtractor 303b, the corresponding component described in embodiment A2, B1, or B2 may be used.

For each pixel in the edge-enhanced enlarged image D100, the brightness information generator 340 generates brightness information D340 indicating whether the pixel is in an area including many pixels with small pixel values.

The brightness information generator 340 calculates, for each pixel P100 in the edge-enhanced enlarged image D100, an average AVE100 of the pixel values D100 of pixels P100 in a given area including the pixel, such as an area neighboring the pixel, and outputs the result as brightness information D340. The average may be a simple average or a weighted average. The brightness information D340 calculated for pixel P100(x, y) will be denoted D340(x, y).

Figure 30A:
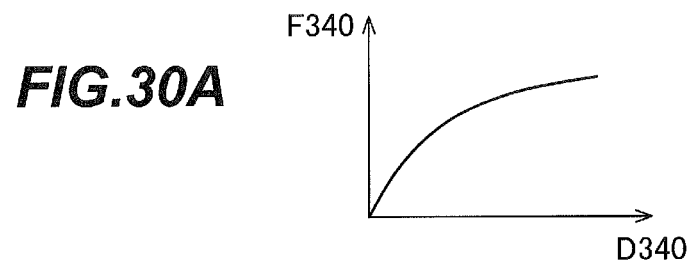
FIGS. 30A to 30E show different examples of the relation between the brightness information D340 and correction coefficient F340.

The diffusion quantity corrector 400d is similar to the diffusion quantity corrector 400 in embodiment A2, but differs in that it determines the corrected diffusion quantity D400 on the basis of the difference diffusion quantity D302 and the brightness information D340. The diffusion quantity corrector 400d obtains a correction coefficient F340 for each pixel P100 in the edge-enhanced enlarged image D100. The correction coefficient F340 calculated for pixel P100(x, y) will be denoted F340(x, y). The correction coefficient F340 (x, y) is determined in accordance with the value of the brightness information D340(x, y). For example, the correction coefficient F340(x, y) is obtained in such a way that it decreases monotonically as the value of the brightness information D340(x, y) decreases, as shown in FIG. 30A.

The diffusion quantity corrector 400d determines a difference diffusion quantity (corrected diffusion quantity) D400 for each pixel P100 in the edge-enhanced enlarged image D100 by correcting the difference diffusion quantity D302 in accordance with the correction coefficient F340. The correction is made, for example, by multiplying the difference diffusion quantity D302 by the correction coefficient F340. If the corrected diffusion quantity D400 calculated for pixel P100(x, y) is denoted D400(x, y), this is expressed as follows.

$$D400(x,y) = F340(x,y) \times D302(x,y) \quad (42)$$

The subtractor 303b outputs a difference-corrected image D303 in which the pixel values are obtained by subtracting the corrected diffusion quantity D400(x, y) calculated for pixel P100(x, y) from the pixel value D100(x, y) of pixel P100(x, y) in the edge-enhanced enlarged image D100. If the pixel at coordinates (x, y) in the difference-corrected image D303 is denoted P303(x, y) and the pixel value of pixel P303(x, y) is denoted D303(x, y), this is expressed as follows.

$$D303(x,y) = D100(x,y) - D400(x,y)$$

The high-resolution image corrector 300 outputs the difference-corrected image D303 as the output image D300.

The effects of the image processing device in this embodiment will be described below.

As described in embodiment A1, the perceived resolution in textured areas can be improved by subtracting the difference diffusion quantity D302 from the edge-enhanced enlarged image D100. However, if the input image D0 or edge-enhanced enlarged image D100 includes an area of pixels having small pixel values (sometimes referred to as a low-brightness area), the picture quality may be lowered.

If fine variations in pixel value (or brightness) appear in a low-brightness area, the S/N ratio may appear to be lowered or noise may appear to have increased, worsening the perceived picture quality.

In the image processing device in this embodiment, for each pixel P100 in the edge-enhanced enlarged image D100, the brightness information generator 340 determines brightness information D340 expressing the average AVE100 of the pixel values D100 of pixels in a certain area including the pixel, such as, for example, an area neighboring the pixel, and the value of the difference diffusion quantity D302 is corrected in accordance with the value of the brightness information D340 as given by the equation (42) so that the corrected diffusion quantity D400 becomes small (or is restrained) in low-brightness areas.

Therefore, in the image processing device in this embodiment, the picture quality of the output image D300 does not deteriorate in low-brightness areas.

The brightness information D340 or correction coefficient F340 used to correct the value of the difference diffusion quantity D302 in low-brightness areas is not limited to the example described above.

The correction of the difference diffusion quantity D302 by the correction coefficient F340 is not limited to the example described above. Any correction that can decrease the difference diffusion quantity to a small value in low-brightness areas may be made.

Figure 30B:
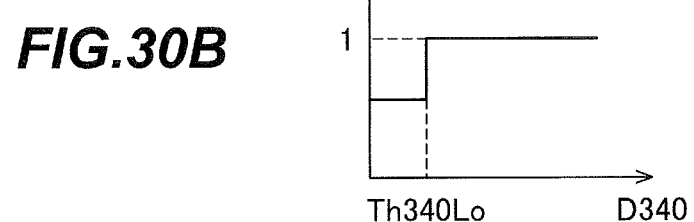

The correction coefficient F340 need not vary continuously with respect to the brightness information D340; it need only have a value less than 1 (or a value that can correct the difference diffusion quantity D302 by reducing it) in at least some sections where, for example, the brightness information D340 falls below a given threshold (low-brightness area detection threshold) Th340Lo, as shown in FIG. 30B.

The calculation for correcting the difference diffusion quantity D302 is not limited to multiplication by the correction coefficient F340. It need only be a process that makes the corrected diffusion quantity D400 smaller than the difference diffusion quantity D302 in at least some sections where the brightness information D340 falls below a given threshold (low-brightness area detection threshold) Th340Lo.

The brightness information D340 is not limited to the example described above; it may be any information that permits the detection of low-brightness areas.

For example, instead of an average AVE100 of pixel values, a value obtained by subtracting the average AVE100 from the maximum gradation level of the pixel value, that is, the maximum value of the gradation range, may be used as the brightness information D340, and the correction coefficient F340 may be adapted to decrease as the brightness information D340 increases.

Figure 31:
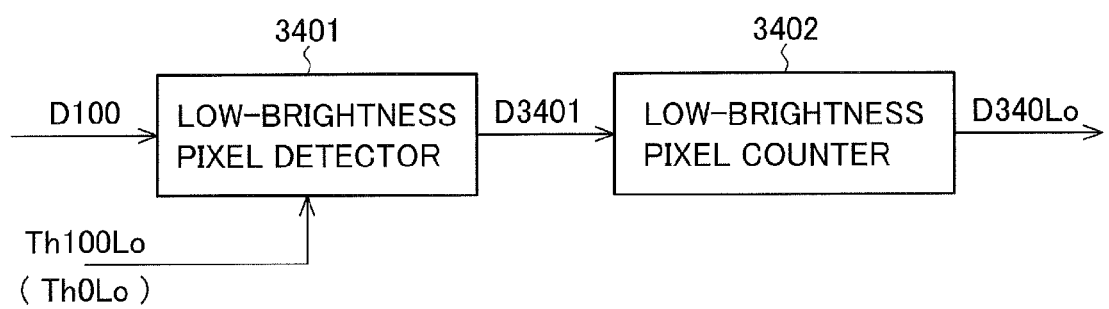
FIG. 31 is a block diagram showing an example of the structure of the brightness information generator 340 in the high-resolution image corrector 300 in FIG. 29.

For example, the brightness information generator 340 may use a count D340Lo(x, y) obtained by counting the number of pixels having a pixel value lower than a given threshold (low-brightness pixel detection threshold) Th100Lo in a given area including pixel P100(x, y), such as an area neighboring the pixel, as the brightness information D340. The brightness information generator 340 used for this purpose includes, for example, a low-brightness pixel detector 3401 and a low-brightness pixel counter 3402, as shown in FIG. 31: the low-brightness pixel detector 3401 detects pixels having pixel values D100 lower than the threshold Th100Lo; the low-brightness pixel counter 3402 counts the detected results (detected pixels) D3401; the count D340Lo is output as the brightness information D340.

The calculation for correcting the difference diffusion quantity D302 may be any process that makes the corrected diffusion quantity D400 smaller than the difference diffusion quantity D302 in at least some sections where the brightness information D340 exceeds the threshold (brightness information threshold) Tn340Lo.

Figure 30C:
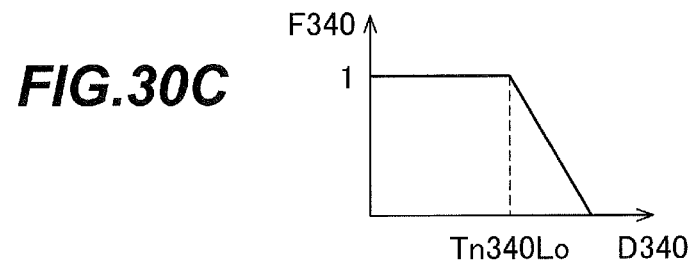

For that purpose, it suffices to generate a correction coefficient F340 that decreases as the brightness information D340 increases in the range exceeding the above threshold (brightness information threshold) Tn340Lo, as shown in FIG. 30C, for example, and obtain the corrected diffusion quantity D400 by multiplying the difference diffusion quantity D302 by the correction coefficient F340.

Except for having different numbers of pixels, the input image D0 and the edge-enhanced enlarged image D100 are the same image, so that the brightness information D340 may be obtained from the input image D0.

For example, for each pixel P100, a local average AVE0 of the pixel values of pixels P0 in the same positions as the corresponding points T in a given area including pixel P100 may be calculated and used as the brightness information D340.

The number of pixels P0 that are located in the same positions as the corresponding points T in a given area including pixel P100(x, y), such as a neighborhood of the pixel, and have pixel values lower than a given threshold (low-brightness pixel detection threshold) Th0Lo (shown in parentheses in FIG. 31) may be used as count D340Lo(x, y).

The process above could be described as a process of using the brightness information generator 340 to detect a local area including many pixels having small pixel values (brightness values) in the edge-enhanced enlarged image D100 or input image D0 and restraining the corrected diffusion quantity D400 so that it does not become large in that area, or restraining the correction for canceling out the difference data D200 in that area.

A process that uses the brightness information D340 to prevent the degradation of picture quality in low-brightness areas has been described above, but the areas in which degradation of picture quality can be prevented by use of the brightness information D340 are not limited to low-brightness areas.

An input image D0 having additional text information such as subtitles will be considered below. If small variations in pixel value are added to the text information, characters are deformed and the visibility or legibility of the text information may be lowered.

The following discussion pertains to a count D340Hi(x, y) obtained by counting the number of pixels having pixel values higher than a given threshold (high-brightness pixel detection threshold) Th100Hi in a given area including pixel P100(x, y). Text information such as subtitles is generally displayed by using pixels of high brightness (or pixels having high pixel values) in order to improve its visibility. The count D340Hi(x, y) in an area including text information is therefore higher than in other areas.

The degradation of visibility of text information can be prevented by using this count D340Hi(x, y) as part of the brightness information D340 and making a correction that makes the corrected diffusion quantity D400 smaller than the difference diffusion quantity D302 in at least some sections where the count D340Hi(x, y) exceeds a given threshold (high-brightness pixel count detection threshold) Tn340Hi.

Figure 32:
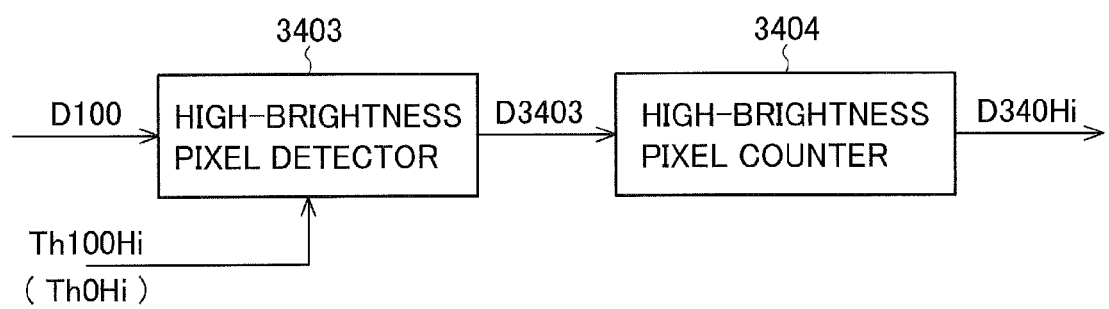
FIG. 32 is a block diagram showing another example of the structure of the brightness information generator 340 in the high-resolution image corrector 300 in FIG. 29.

To carry out the process described above, a brightness information generator 340 including, for example, a high-brightness pixel detector 3403 and a high-brightness pixel counter 3404 as shown in FIG. 32 is used. Pixels in the edge enhanced enlarged image that have pixel values D100 greater than the threshold Th100Hi can be detected by the high-brightness pixel detector 3403, the detected results (detected pixels) can be counted by the high-brightness pixel counter 3404, and the count D340Hi can be output as the brightness information D340.

The example given above is not limiting; any count that can detect areas in which many pixels with large pixel values appear can be used as count D340Hi(x, y).

Count D340Hi(x, y) may be obtained from the input image D0, for example. The number of pixels P0 in the same positions as the corresponding points T in a given area including pixel P100(x, y), such as an area neighboring this pixel, that have pixel values exceeding the given threshold (high-brightness pixel count detection threshold) Th0Hi (shown in parentheses in FIG. 32) may be used as count D340Hi (x, y).

The average AVE100 or AVE0 can also be used as brightness information D340 to prevent the visibility of text information from being lowered. Since text information is displayed by use of pixels with high pixel values, as noted above, the average AVE100 or AVE0 has a high value in areas where text information is displayed. If those values are used as the brightness information D340, a correction that makes the corrected diffusion quantity D400 smaller than the difference diffusion quantity D302 in at least some sections where the brightness information D340 exceeds a given threshold (high-brightness area detection threshold) Th340Hi can be made.

Figure 30D:
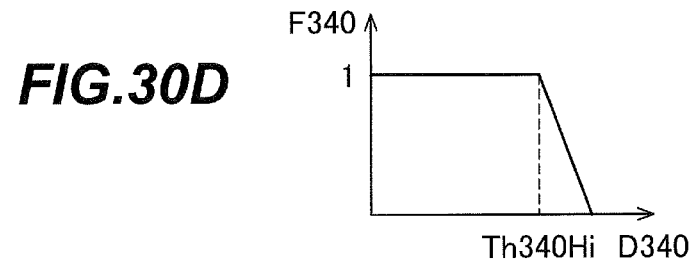

For that purpose, the correction coefficient F340 should decrease as the brightness information D340 increases in areas where the brightness information D340 exceeds the given threshold (high brightness area detection threshold) Th340Hi, as shown in FIG. 30D, for example.

The above process could be described as a process of using the brightness information generator 340 to detect local areas including many pixels having high pixel values (brightness values) in the edge-enhanced enlarged image D100 or input image D0 and restraining the corrected diffusion quantity D400 so that it does not become large in that area, or restraining the correction for canceling out the difference data D200 in that area.

Figure 30E:
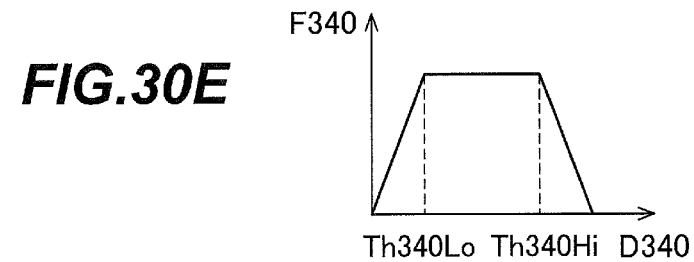

It is possible to prevent both the degradation of picture quality in low-brightness areas and the degradation of the visibility of text information. If the average AVE100 or AVE0 is used as the brightness information D340, processing to make the corrected diffusion quantity D400 smaller than the difference diffusion quantity D302 should be carried out in at least some sections where the brightness information D340 is lower than a given threshold (low brightness area detection threshold) Th340Lo and in at least some sections where the brightness information D340 exceeds another threshold (high brightness area detection threshold) Th340Hi (>Th340Lo). For that purpose, it suffices to have the correction coefficient F340 decrease as the brightness information D340 decreases when the value of the brightness information D340 is lower than the low brightness area detection threshold Th340Lo and decrease as the brightness information D340 increases when the value of the brightness information D340 is higher than the high brightness area detection threshold Th340Hi, as shown, for example, in FIG. 30E.

Alternatively, counts D340Lo(x, y) and D340Hi(x, y) may be used as the brightness information D340, and processing may be performed to make the corrected diffusion quantity D400 smaller than the difference diffusion quantity D302 in at least some sections where count D340Lo(x, y) exceeds a given threshold (low brightness pixel count detection threshold) Tn340Lo and in at least some sections where count D340Hi(x, y) exceeds another threshold (high brightness pixel count detection threshold) Tn340Hi.

Figure 33:
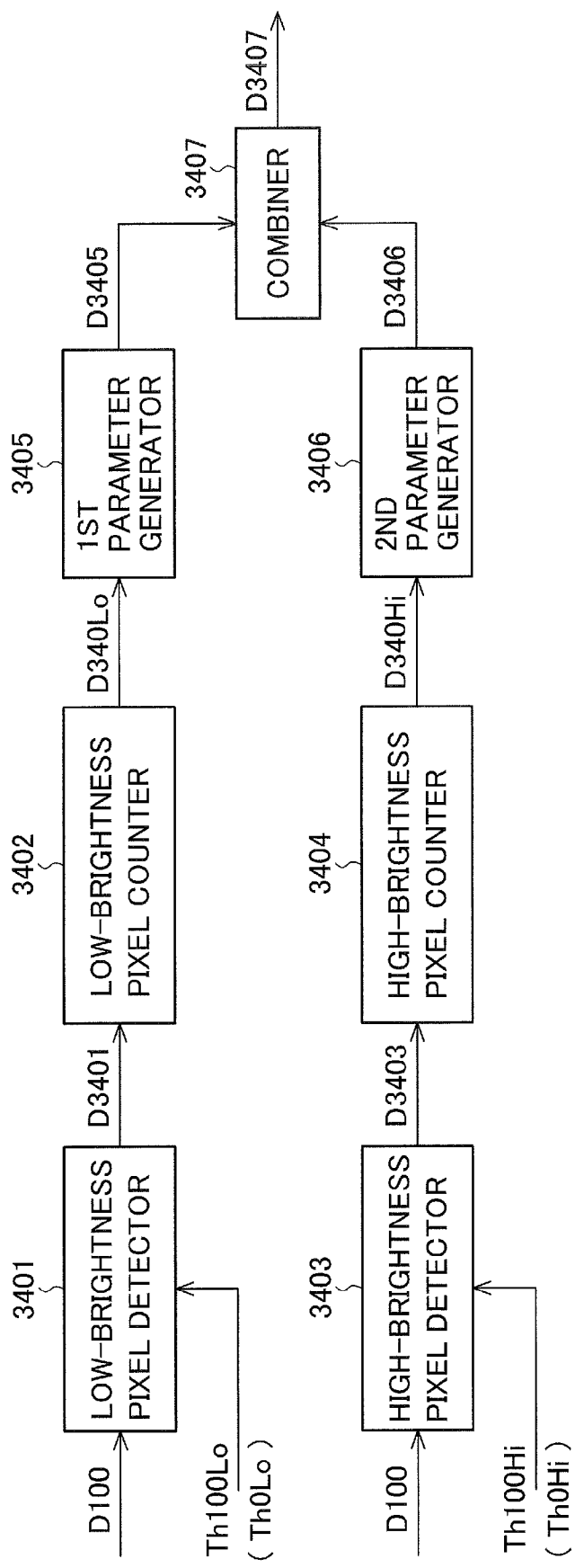
FIG. 33 is a block diagram showing still another example of the structure of the brightness information generator 340 in the high-resolution image corrector 300 in FIG. 29.

The brightness information generator 340 that may be used for that purpose is shown in FIG. 33, and includes, for example, a low-brightness pixel detector 3401 and a low-brightness pixel counter 3402, like those shown in FIG. 31, a high-brightness pixel detector 3403 and a high-brightness pixel counter 3404, like those shown in FIG. 32, and in addition a first parameter generator 3405, a second parameter generator 3406, and a combiner 3407. The first parameter generator 3405 generates a first parameter D3405 that is '1' when count D340Lo is equal to or less than the low brightness pixel count detection threshold Tn340Lo and decreases as count D340Lo increases in a range above the low brightness pixel count detection threshold Tn340Lo. The second parameter generator 3406 generates a second parameter D3406 that is '1' when count D340Hi is equal to or less than the high brightness pixel count detection threshold Tn340Hi and decreases as count D340Hi increases in a range above the high brightness pixel count detection threshold Tn340Hi. The combiner 3407 can derive the correction coefficient F340 by a process of selecting whichever of the first parameter D3405 and second parameter D3406 has the smaller value, or a process of multiplying the first and second parameters D3405, D3406 together.

The image processing device in embodiment C1 creates pixels having various pixel values in textured areas so that the perceived resolution is improved in textured areas, as in embodiment A1. In addition, the S/N ratio does not deteriorate in local areas of low brightness, and when text information is added, its visibility is not degraded.

Like the image processing device in embodiment A1, the image processing device in this embodiment can also be used as part of an image display device. For example, the image processing device in this embodiment may be included, instead of the image processing device in embodiment A1, in the input image processor U1 in the image display device in FIG. 10.

One can conceive of various alterations that can be made to the image processing device in this embodiment without departing from its gist. In particular, the same alterations as described in embodiments A1, A2, B1, B2 can be made.

Embodiment C2

Like the image processing device in embodiment C1, the image processing device in embodiment C2 can be implemented by the structure shown in FIG. 1. The structure and operation of the high-resolution image corrector 300 are different, however, from those of the image processing device in embodiment C1. Like the image processing device in embodiment C1, the image processing device in embodiment C2 can also be used as part of an image display device.

Figure 34:
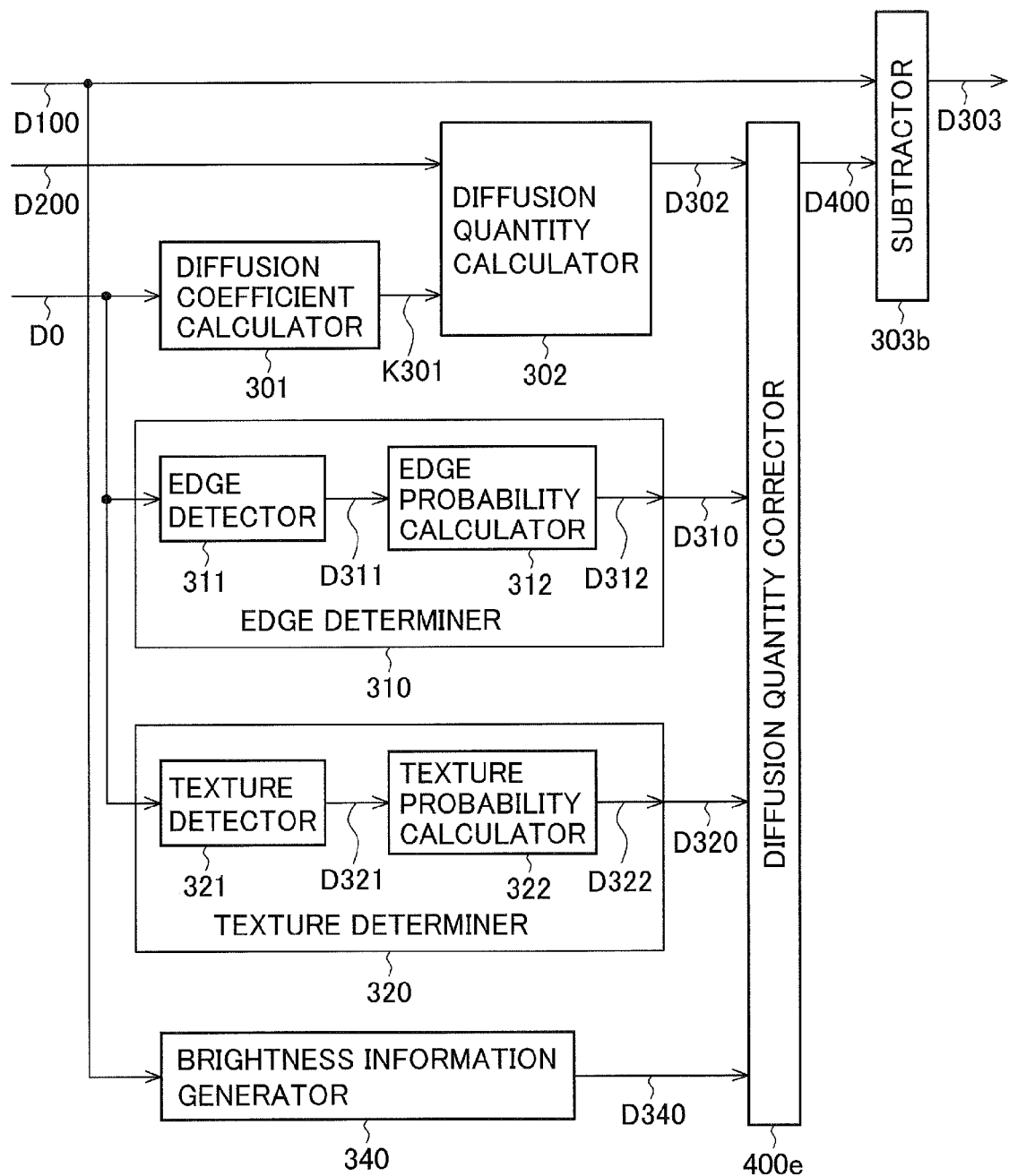
FIG. 34 is a block diagram showing an example of the structure of the high-resolution image corrector 300 in FIG. 1, as used in embodiment C2 of the invention.

FIG. 34 shows an example of the structure of the high-resolution image corrector 300 in embodiment C2.

The high-resolution image corrector 300 in FIG. 34 includes a diffusion coefficient calculator 301, a diffusion quantity calculator 302, an edge determiner 310, a texture determiner 320, a brightness information generator 340, a diffusion quantity corrector 400e, and a subtractor 303b.

As the diffusion coefficient calculator 301 and diffusion quantity calculator 302, the corresponding components described in embodiment A1, A2, B1, B2, or C1 may be used. As the subtractor 303b, the corresponding component described in embodiment A2, B1, B2, or C1 may be used. As the brightness information generator 340, the corresponding component described in embodiment C1 may be used.

As the edge determiner 310 and texture determiner 320, the corresponding components described in embodiment A2 or B2 may be used.

The diffusion quantity corrector 400e is similar to the diffusion quantity corrector 400d in embodiment C1 but differs in that the corrected diffusion quantity D400 is obtained from an edge determination result D310 and a texture determination result D320 as well as from the difference diffusion quantity D302 and brightness information D340. The diffusion quantity corrector 400e corrects the value of the difference diffusion quantity D302 in accordance with a correction coefficient F310 varying with the edge determination result D310 and a correction coefficient F320 varying with the texture determination result D320, as well as the correction coefficient F340 varying with the brightness information D340 described in embodiment C1.

Correction coefficients F310 and F320 are obtained as in embodiment A2. Correction coefficient F340 is obtained as in embodiment C1.

The diffusion quantity corrector 400e determines a corrected diffusion quantity D400 for each pixel P100 in the edge-enhanced enlarged image D100 by correcting the difference diffusion quantity D302 in accordance with the values of the correction coefficients F310, F320, F340. The correction is made by, for example, multiplying the difference diffusion quantity D302 by the correction coefficients F310, F320, F340. If the corrected diffusion quantity D400 calculated for pixel P100(x, y) is denoted D400(x, y), this can be expressed as follows.

$$D400(x,y)=F310(x,y){\times}F320(x,y){\times}F340{\times}D302(x,y)$$

The subtractor 303b outputs a difference-corrected image D303 in which the pixel values are obtained by subtracting the corrected diffusion quantity D400(x, y) calculated for each pixel P100(x, y) from the pixel value D100(x, y) of pixel P100(x, y) in the edge-enhanced enlarged image D100. The pixel value D303(x, y) in the difference-corrected image D303 is accordingly expressed as follows.

$$D303(x,y)=D100(x,y)-D400(x,y)$$

The high-resolution image corrector 300 outputs the difference-corrected image D303 as the output image D300.

The diffusion quantity corrector 400e in this embodiment differs from embodiment C1 in that the degree of correction of the difference diffusion quantity D302 varies based on correction factors F310 and F320 as well as correction factor F340.

When it is highly probable that pixel P100 lies in an edge area, diffusion of the difference data D200 can be restrained by varying the corrected diffusion quantity D400 with the correction factor F310. With this process, the perceived resolution in textured areas can be improved while preserving as much of the effect of edge enhancement in the edge-enhancing image enlarger 100 as possible.

In addition, when it is highly probable that pixel P100 lies in a textured area, diffusion of the difference data D200 is performed (not inhibited) by varying the corrected diffusion quantity D400 in accordance with correction coefficient F320. This can also restrain diffusion of difference data D200 in areas, typically edge areas, that lie outside textured areas, so that the perceived resolution in textured areas can be improved while preserving the effect of edge enhancement in the edge-enhancing image enlarger 100.

Therefore, the image processing device in this embodiment can improve perceived resolution in textured areas while preserving the effect of edge enhancement by the edge-enhancing image enlarger 100.

The perceived resolution in textured areas can be improved while preserving the effect of edge enhancement in the edge-enhancing image enlarger 100 by using at least one of correction coefficients F310 and F320.

One can conceive of various alterations that can be made to the image processing device in this embodiment without departing from its gist. In particular, the same alterations as described in embodiments A1, A2, B1, B2, and C1 can be made.

Embodiment C3

The invention is implemented by hardware in embodiment C1, but processing identical to the image processing in embodiment C1 can also be implemented by software. Like the image processing method in embodiment A3, the image processing method in embodiment C3 can be implemented by the image processing device in FIG. 15 and can also be used as part of an image display device.

Like the image processing method in embodiment A3, the image processing method in embodiment C3 can be implemented by the procedure shown in FIG. 16. The processing in the high-resolution image correction step ST300 differs, however, from the processing in the image processing method in embodiment A3.

Figure 35:
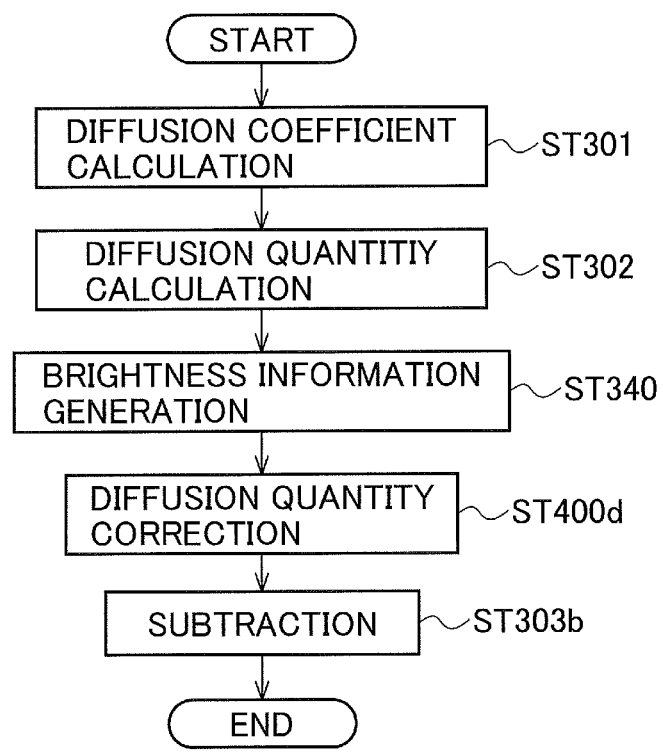
FIG. 35 is a flowchart illustrating the processing procedure used in embodiment C3 of the invention in the high-resolution image correction step ST300 in FIG. 16.

FIG. 35 illustrates the flow of processing in the high-resolution image correction step ST300 in embodiment C3. This high-resolution image correction step ST300 includes a diffusion coefficient calculation step ST301, a diffusion quantity calculation step ST302, a brightness information generation step ST340, a diffusion quantity correction step ST400d, and a subtraction step ST303b.

The operations in the diffusion coefficient calculation step ST301 and diffusion quantity calculation step ST302 are the same as in embodiment A3.

The processing performed in the brightness information generation step ST340 is the same as the processing performed in the brightness information generator 340 in embodiment C1.

The processing performed in the diffusion quantity correction step ST400d is the same as the processing performed in the diffusion quantity corrector 400d in embodiment C1.

The processing performed in the subtraction step ST303b is the same as the processing performed in the subtractor 303b in embodiment C1.

The above is the processing in the image processing method in embodiment C3, which is equivalent in content to the image processing device in embodiment C1. The image processing method in embodiment C3 therefore has the same effect as the image processing device in embodiment C1.

The alterations that can be made to the image processing device in embodiment C1 can also be applied to the image processing method in embodiment C3.

Embodiment C4

The invention was described as being implemented by hardware in embodiment C2, but the same processing as done by the image processing device in embodiment C2 can also be implemented by software. Like the image processing method in embodiment C3, an image processing method in embodiment C4 can be implemented by the image processing device in FIG. 15 and can also be used as part of an image display device.

Like the image processing method in embodiment C3, the image processing method in embodiment C4 can be implemented by the procedure shown in FIG. 16. The processing in the high-resolution image correction step ST300 differs, however, from the processing in the image processing method in embodiment C3.

Figure 36:
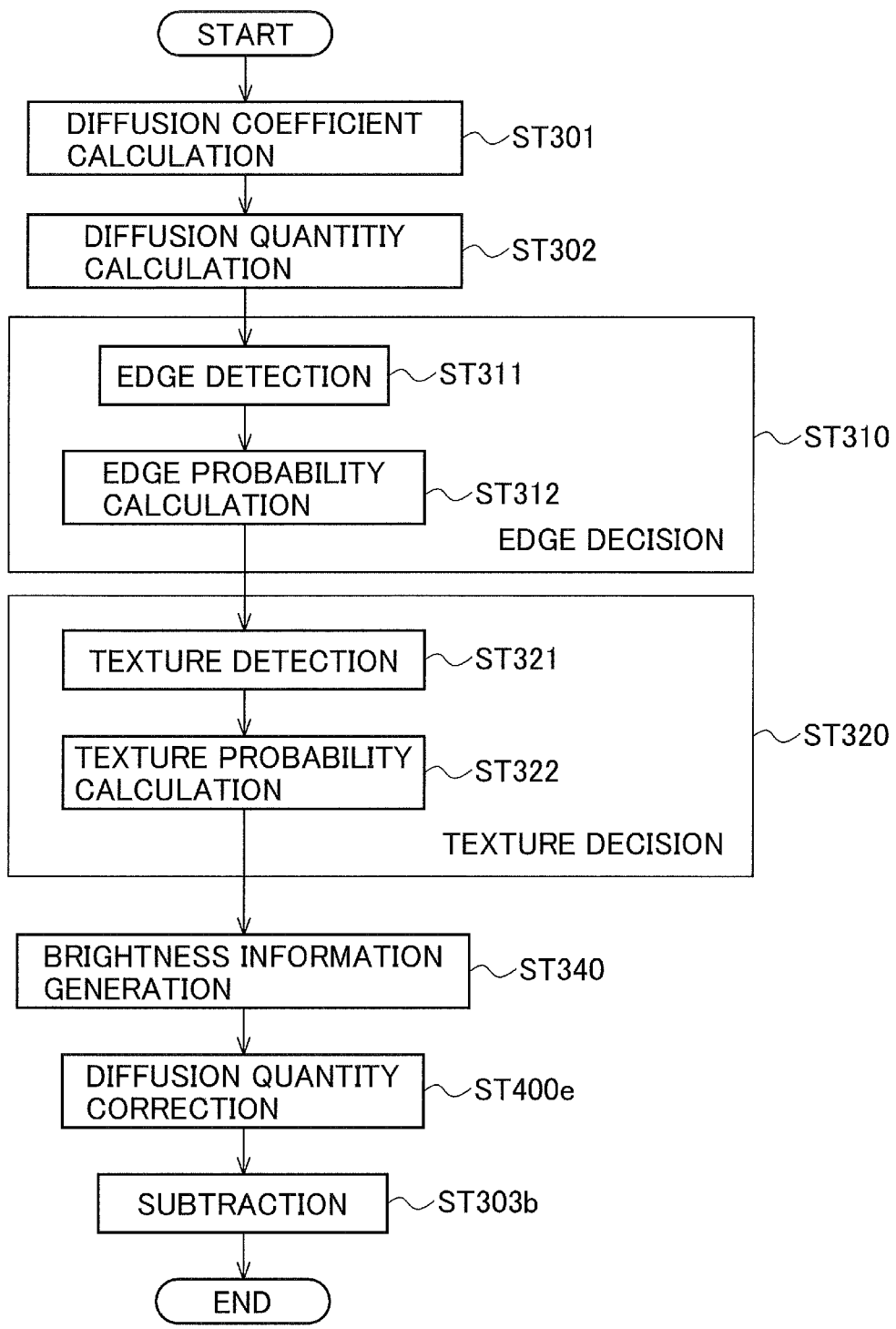
FIG. 36 is a flowchart illustrating the processing procedure used in embodiment C4 of the invention in the high-resolution image correction step ST300 in FIG. 16.

FIG. 36 illustrates the flow of processing in the high-resolution image correction step ST300 in embodiment C4. This high-resolution image correction step ST300 includes a diffusion coefficient calculation step ST301, a diffusion quantity calculation step ST302, an edge decision step ST310, a texture decision step ST320, a brightness information generation step ST340, a diffusion quantity correction step ST400e, and a subtraction step ST303b.

The operations in the diffusion coefficient calculation step ST301, diffusion quantity calculation step ST302, and brightness information generation step ST340 are the same as in embodiment C3.

The operations in the edge decision step ST310 and texture decision step ST320 are the same as in embodiment A4.

The diffusion quantity correction step ST400e performs the same processing as the diffusion quantity corrector 400e in embodiment C2.

The subtraction step ST303b performs the same processing as the subtractor 303b in embodiment C2.

The above is the processing in the image processing method in embodiment C4, which is equivalent in content to the image processing device in embodiment C2. The image processing method in embodiment C4 therefore has the same effect as the image processing device in embodiment C2.

The alterations that can be made to the image processing device in embodiment C2 can also be applied to the image processing method in embodiment C4.

Programs for executing the image processing methods in embodiments A3, A4, B3, B4, C3, and C4 of the invention by a computer, and computer-readable recording media in which these the programs are recorded, are also part of the invention.

Those skilled in the art will recognize that further variations are possible within the scope of the invention, which is defined in the appended claims.

What is claimed is:

1. An image processing device comprising:
an edge-enhancing image enlarger for converting an input image having a first resolution to a high-resolution image having a second resolution, edges included in the input image being enhanced in the high-resolution image;
a difference calculator for determining differences between the high-resolution image and the input image; and
a high-resolution image corrector for correcting the high-resolution image by diffusing the differences to pixels in the high-resolution image, thereby generating a corrected image, and outputting the corrected image as an output image.

2. The image processing device of claim 1, wherein the high-resolution image corrector includes a texture determiner for detecting an area of the input image having many local variations in pixel value as a textured area, and retrains corrections that cancel out, at least in part, the differences outside a vicinity of the area detected as the textured area.

3. The image processing device of claim 1, wherein the difference calculator includes:
- a corresponding-point specifier for specifying, as a corresponding point, a position on which each pixel in the input image is superimposed when the input image is superimposed on the high-resolution image;
- a corresponding-point pixel value calculator for determining, from pixel values in the high-resolution image, a pixel value for an assumed pixel at the corresponding point identical in size to the pixel in the input image; and
- a first subtractor for determining said differences by taking differences between pixel values of the pixels in the input image and pixel values determined by the corresponding-point pixel value calculator at the corresponding points determined by the corresponding-point specifier.

4. The image processing device of claim 3, wherein the high-resolution image corrector includes a diffusion coefficient calculator for determining diffusion coefficients for each said corresponding point, the diffusion coefficients determining allocations of the difference taken by the first subtractor at the corresponding point for diffusion to pixels in the high-resolution image in a vicinity of the corresponding point.

5. The image processing device of claim 4, wherein the high-resolution image corrector further includes:
- a diffusion quantity calculator for using the diffusion coefficients to determine, for each pixel in the high-resolution image, one or more diffused differences diffused to the pixel from one or more corresponding points in a vicinity of said each pixel and summing the diffused differences diffused to said each pixel to determine and output a diffusion quantity diffused to said each pixel; and
- a second subtractor for subtracting the diffusion quantity output by the diffusion quantity calculator for said each pixel from the pixel value of said each pixel in the high-resolution image output from the edge-enhancing image enlarger to obtain a pixel value of said each pixel in the corrected image.

6. The image processing device of claim 4, wherein the diffusion coefficients are obtained by weighted addition of mutually differing matrices.

7. The image processing device of claim 6, wherein the mutually differing matrices are linearly independent.

8. The image processing device of claim 6, wherein weighting coefficients for the weighted addition vary depending on the corresponding point.

9. The image processing device of claim 6, wherein weighting coefficients for the weighted addition are determined in accordance with variations in pixel value in the input image.

10. The image processing device of claim 1, wherein the high-resolution image corrector further includes an edge detector for detecting edges in the input image, and corrections that cancel out said differences are restrained in vicinities, when the input image is superimposed on the high-resolution image, of positions where the edges are detected.

11. The image processing device of claim 1, wherein the high-resolution image corrector further includes a periodicity determiner for detecting a part of the high-resolution image including a periodic pattern, and restrains corrections that cancel out said differences in said part.

12. The image processing device of claim 1, wherein the high-resolution image corrector detects an area of the high-resolution image or the input image including many pixels having small pixel values or including many pixels having large pixel values and restrains corrections that cancel out said differences in the detected area.

13. An image display device including the image processing device of any one of claims 1 to 12.

14. An image processing method comprising:
- converting an input image having a first resolution to a high-resolution image having a second resolution, edges included in the input image being enhanced in the high-resolution image;
- determining differences between the high-resolution image and the input image; and
- correcting the high-resolution image by diffusing the differences to pixels of the high-resolution image, thereby generating a corrected image, and outputting the corrected image as an output image.

15. An image display device for displaying an image processed by the image processing method of claim 14.

16. A computer-readable recording medium storing a program executable by the computer to carry out the image processing method of claim 14.

* * * * *